United States Patent
Chadalavada et al.

(10) Patent No.: US 8,149,691 B1
(45) Date of Patent: *Apr. 3, 2012

(54) PUSH-BASED HIERARCHICAL STATE PROPAGATION WITHIN A MULTI-CHASSIS NETWORK DEVICE

(75) Inventors: Bharani Chadalavada, Santa Clara, CA (US); Umesh Krishnaswamy, San Jose, CA (US); Raj Tuplur, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 12/411,113

(22) Filed: Mar. 25, 2009

Related U.S. Application Data

(63) Continuation of application No. 11/280,887, filed on Nov. 16, 2005, now Pat. No. 7,518,986.

(51) Int. Cl.
*H04L 12/26* (2006.01)

(52) U.S. Cl. ........ 370/219; 370/386; 709/221; 709/248; 714/2; 714/43

(58) Field of Classification Search .......... 370/216–220, 370/386–389, 398, 503, 509, 512; 709/208, 709/220, 221, 248; 714/2–46, 47

See application file for complete search history.

(56) References Cited

U.S. PATENT DOCUMENTS

| | | | |
|---|---|---|---|
| 5,454,080 A | 9/1995 | Fasig et al. | |
| 5,684,984 A | 11/1997 | Jones et al. | |
| 5,848,227 A | 12/1998 | Sheu | |
| 6,154,847 A | 11/2000 | Schofield et al. | |
| 6,161,151 A | 12/2000 | Sudhakaran et al. | |
| 6,205,502 B1 | 3/2001 | Endo et al. | |
| 6,219,706 B1 | 4/2001 | Fan et al. | |
| 6,253,266 B1 | 6/2001 | Ohanian | |
| 6,285,679 B1 | 9/2001 | Dally et al. | |
| 6,308,176 B1 | 10/2001 | Bagshaw | |
| 6,370,145 B1 | 4/2002 | Dally et al. | |
| 6,594,229 B1 | 7/2003 | Gregorat | |
| 6,594,721 B1 | 7/2003 | Sakarda et al. | |
| 6,597,689 B1 | 7/2003 | Chiu et al. | |
| 6,618,805 B1 | 9/2003 | Kampe | |

(Continued)

FOREIGN PATENT DOCUMENTS

CN 1663196 A 8/2005

(Continued)

OTHER PUBLICATIONS

Notice of Allowance from U.S. Appl. No. 11/235,715, mailed Feb. 19, 2010, 16 pp.

(Continued)

*Primary Examiner* — Jeffrey M Rutkowski
(74) *Attorney, Agent, or Firm* — Shumaker & Sieffert, P.A.

(57) ABSTRACT

A multi-chassis network device sends state information to internal consumers within the multi-chassis device via a hierarchical distribution. As one example, a primary master routing engine within a control node of a multi-chassis router forwards state information to local routing engines within other chassis, which in turn distribute the state information to consumers on each chassis. Each local routing engine defers sending acknowledgement to the master routing engine until acknowledgements have been received from all consumers serviced by the local routing engine. Embodiments of the invention may reduce control plane data traffic and convergence times associated with distribution of state updates in the multi-chassis network device.

17 Claims, 8 Drawing Sheets

U.S. PATENT DOCUMENTS

| | | | |
|---|---|---|---|
| 6,633,544 | B1 | 10/2003 | Rexford et al. |
| 6,654,381 | B2 | 11/2003 | Dally et al. |
| 6,671,694 | B2 | 12/2003 | Baskins et al. |
| 6,751,191 | B1 * | 6/2004 | Kanekar et al. ............... 370/217 |
| 6,799,319 | B2 | 9/2004 | Van Loo |
| 6,816,936 | B1 | 11/2004 | Wu et al. |
| 6,854,069 | B2 | 2/2005 | Kampe et al. |
| 6,865,591 | B1 | 3/2005 | Garg et al. |
| 6,865,737 | B1 | 3/2005 | Lucas et al. |
| 6,910,148 | B1 | 6/2005 | Ho et al. |
| 6,941,487 | B1 | 9/2005 | Balakrishnan et al. |
| 6,948,088 | B1 | 9/2005 | Sharan |
| 6,965,903 | B1 | 11/2005 | Agarwal et al. |
| 6,966,058 | B2 | 11/2005 | Earl et al. |
| 6,980,543 | B1 | 12/2005 | Kastenholz et al. |
| 6,981,173 | B2 | 12/2005 | Ferguson et al. |
| 6,983,317 | B1 | 1/2006 | Bishop et al. |
| 7,000,153 | B2 | 2/2006 | Inagawa et al. |
| 7,010,617 | B2 | 3/2006 | Kampe et al. |
| 7,046,683 | B1 | 5/2006 | Zhao |
| 7,054,924 | B1 | 5/2006 | Harvey et al. |
| 7,054,926 | B1 | 5/2006 | Abidi et al. |
| 7,061,858 | B1 * | 6/2006 | Di Benedetto et al. ....... 370/219 |
| 7,069,354 | B2 | 6/2006 | Pooni et al. |
| 7,076,555 | B1 | 7/2006 | Orman et al. |
| 7,076,696 | B1 | 7/2006 | Stringer |
| 7,096,383 | B2 | 8/2006 | Talaugon et al. |
| 7,111,035 | B2 | 9/2006 | McClellan et al. |
| 7,117,311 | B1 | 10/2006 | Rankin et al. |
| 7,146,448 | B2 | 12/2006 | Davies et al. |
| 7,151,741 | B1 | 12/2006 | Elliot et al. |
| 7,154,902 | B1 | 12/2006 | Sikdar |
| 7,155,534 | B1 | 12/2006 | Meseck et al. |
| 7,159,017 | B2 | 1/2007 | Oi et al. |
| 7,162,737 | B2 | 1/2007 | Syvanne et al. |
| 7,164,676 | B1 | 1/2007 | Chakraborty |
| 7,167,479 | B2 | 1/2007 | Christensen et al. |
| 7,178,052 | B2 * | 2/2007 | Hebbar et al. .................. 714/4.4 |
| 7,233,975 | B1 | 6/2007 | Gerraty et al. |
| 7,263,091 | B1 | 8/2007 | Woo et al. |
| 7,274,702 | B2 | 9/2007 | Toutant et al. |
| 7,275,081 | B1 | 9/2007 | Katz et al. |
| 7,277,018 | B2 | 10/2007 | Reyes et al. |
| 7,406,038 | B1 | 7/2008 | Oelke et al. |
| 7,411,925 | B2 * | 8/2008 | Nain et al. .................... 370/219 |
| 7,430,735 | B1 | 9/2008 | Balakrishnan et al. |
| 7,461,374 | B1 | 12/2008 | Balint et al. |
| 7,518,986 | B1 * | 4/2009 | Chadalavada et al. ........ 370/218 |
| 7,552,262 | B1 | 6/2009 | Turner et al. |
| 7,804,769 | B1 * | 9/2010 | Tuplur et al. .................. 370/218 |
| 2001/0017863 | A1 | 8/2001 | McMillian et al. |
| 2002/0060986 | A1 | 5/2002 | Fukushima et al. |
| 2002/0103921 | A1 | 8/2002 | Nair et al. |
| 2002/0107966 | A1 | 8/2002 | Baudot et al. |
| 2002/0133400 | A1 | 9/2002 | Terry et al. |
| 2002/0147974 | A1 | 10/2002 | Wookey |
| 2002/0191619 | A1 | 12/2002 | Shafer |
| 2002/0198974 | A1 | 12/2002 | Shafer |
| 2003/0007493 | A1 | 1/2003 | Oi et al. |
| 2003/0056138 | A1 | 3/2003 | Ren |
| 2003/0084371 | A1 | 5/2003 | Mongazon-Cazavet et al. |
| 2003/0099247 | A1 | 5/2003 | Toutant et al. |
| 2003/0147376 | A1 | 8/2003 | Coutinho et al. |
| 2003/0179706 | A1 | 9/2003 | Levy et al. |
| 2003/0185226 | A1 | 10/2003 | Tang et al. |
| 2003/0200330 | A1 | 10/2003 | Oelke et al. |
| 2003/0217096 | A1 | 11/2003 | McKelvie et al. |
| 2003/0235195 | A1 | 12/2003 | Shenoy et al. |
| 2004/0030766 | A1 | 2/2004 | Witkowski |
| 2004/0031030 | A1 | 2/2004 | Kidder et al. |
| 2004/0034871 | A1 | 2/2004 | Lu |
| 2004/0042395 | A1 | 3/2004 | Lu et al. |
| 2004/0062196 | A1 | 4/2004 | Gunner et al. |
| 2004/0073646 | A1 | 4/2004 | Cho et al. |
| 2004/0073831 | A1 | 4/2004 | Yanai et al. |
| 2004/0078619 | A1 | 4/2004 | Vasavada |
| 2004/0078621 | A1 | 4/2004 | Talaugon et al. |
| 2004/0078625 | A1 | 4/2004 | Rampuria et al. |
| 2004/0111578 | A1 | 6/2004 | Goodman et al. |
| 2004/0199808 | A1 | 10/2004 | Freimuth et al. |
| 2004/0230759 | A1 | 11/2004 | Braun et al. |
| 2005/0013308 | A1 | 1/2005 | Wybenga et al. |
| 2005/0060413 | A1 | 3/2005 | Oyadomari et al. |
| 2005/0063308 | A1 | 3/2005 | Wise et al. |
| 2005/0175017 | A1 | 8/2005 | Christensen et al. |
| 2005/0216910 | A1 | 9/2005 | Marchand |
| 2005/0226144 | A1 | 10/2005 | Okita |
| 2005/0257213 | A1 | 11/2005 | Chu et al. |
| 2006/0007944 | A1 | 1/2006 | Movassaghi et al. |
| 2006/0039384 | A1 | 2/2006 | Dontu et al. |
| 2006/0056285 | A1 | 3/2006 | Krajewski, III et al. |
| 2006/0089985 | A1 | 4/2006 | Poletto |
| 2006/0101375 | A1 | 5/2006 | Loughlin et al. |
| 2006/0120342 | A1 | 6/2006 | Christensen et al. |
| 2006/0223466 | A1 | 10/2006 | Behzad |
| 2007/0006056 | A1 | 1/2007 | Lehner et al. |
| 2007/0019642 | A1 * | 1/2007 | Lu et al. ........................ 370/389 |
| 2008/0044181 | A1 | 2/2008 | Sindhu |
| 2008/0275975 | A1 | 11/2008 | Pandey et al. |

FOREIGN PATENT DOCUMENTS

| | | | |
|---|---|---|---|
| EP | 1 202 598 A2 | 5/2002 | |
| EP | 1 231 538 A2 | 8/2002 | |
| EP | 1 396 968 A2 | 3/2004 | |

OTHER PUBLICATIONS

Xiaozhe Zhang, "ARS: An Sychronization Algorithm Maintaining Single Image Among Nodes' Forwarding Tables of Clustered Router," Sep. 6, 2005, Springer Berlin/Heidelberg, vol. 3619/2005, pp. 752-761.

Office Action for U.S. Appl. No. 12/028,455 dated Jun. 15, 2010, 17 pp.

Response to Office Action for U.S. Appl. No. 12/028,455 dated Aug. 16, 2010, 4 pp.

Advisory Action for U.S. Appl. No. 12/028,455 dated Aug. 27, 2010, 2 pp.

Response to Office Action for U.S. Appl. No. 12/028,455 dated Sep. 15, 2010, 4 pp.

Notice of Allowance for U.S. Appl. No. 11/292,204 dated May 26, 2010, 15 pp.

Wagner, U., "Multichassis-Core-Router fuer Next-Generation-IP-Netze", Nachrichtentechnische Zeitschrift, Verlag GmbH, DE, vol. 55, No. 7/08, Jan. 1, 2002, pp. 26-27.

Office Action for U.S. Appl. No. 11/235,468, dated Jun. 28, 2010, 28 pp.

Response to Office Action for U.S. Appl. No. 11/235,468, dated Sep. 28, 2010, 6 pp.

Office Action from U.S. Appl. No. 11/847,728, dated Jul. 14, 2010, 6 pp.

Response to Office Action dated Jul. 14, 2010, from U.S. Appl. No. 11/847,728, filed Oct. 8, 2010, 2 pp.

Office Action from U.S. Appl. No. 13/073,753, dated Jul. 27, 2011, 8 pp.

Response to Office Action dated Jul. 27, 2011, from U.S. Appl. No. 13/073,753, filed Aug. 5, 2011, 9 pp.

Notice of Allowance from U.S. Appl. No. 13/073,753, mailed Aug. 30, 2011, 7 pp.

* cited by examiner

PUSH-BASED HIERARCHICAL STATE PROPAGATION WITHIN A MULTI-CHASSIS NETWORK DEVICE

This application is a continuation of U.S. application Ser. No. 11/280,887, filed Nov. 16, 2005, the entire content of which is incorporated herein by reference.

TECHNICAL FIELD

The invention relates to computer networks and, more particularly, to systems for routing packets within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain tables of information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

The physical connection between devices within the network is generally referred to as a link. A router uses interface cards (IFCs) for receiving and sending data packets via network links. These IFCs are installed in ports known as interfaces and are configured using interface configurations.

Generally, a router maintains state information. For example, a router may maintain state information representing the current state of the interfaces between the router and the network. Such state information may include information representing the state of one or more IFCs, such as the current configuration of the IFCs. As additional examples, a router may maintain state information representing the state of one or more packet forwarding engines (PFEs), one or more routing engines, or other resources within the router.

In particular, a process, e.g., a control node known as a "routing engine," operating within a router may maintain the state information and communicate changes to the state information to various other processes or components within the router. These other processes or components are sometimes referred to as "consumers," because they receive and utilize the state information maintained by the operating system. These consumers make use of the state information when performing their various functions.

As the complexity of conventional networks has increased in recent years, management of the state information within a router or other network device has likewise become a significant challenge. Some existing methods for managing state information involve caching the information within the operating system, and issuing state update notification messages to software modules executing within the router. In response, the software modules retrieve the state information from the operating system.

To increase reliability, some routers may include a primary routing engine and one or more standby routing engines. Both primary and standby routing engines may require state information. In the event that the primary routing engine fails, one of the standby routing engines assumes control of the routing resources to continue operation of the router. The process of switching control of routing functions between the primary and standby routing engines is often referred to as failover. In some instances, to assume proper control and ensure operation, the standby routing engine is forced to "relearn" the lost state information from each resource, e.g., by power cycling the router resources to a known state. This causes an interruption in packet forwarding while the router resources restart operations.

Routers have not only developed to be more reliable, but also to meet increasing bandwidth demands. One way to meet increasing bandwidth needs is to use multi-chassis routers, i.e., routers in which multiple routing devices are physically coupled and configured to operate as a single router. For example, a multi-chassis router may contain multiple line card chassis (LCCs), which include one or more IFCs, and a central switch card chassis (SCC), which forward packets between the LCCs and provides top-down management of the multi-chassis router. Because multi-chassis routers combine resources of multiple routing devices, multi-chassis routers typically have much higher bandwidth capabilities than standalone routers. The use of multi-chassis routers can simplify and improve routing on a service provider network by consolidating routing functions onto fewer routers. However, forwarding state information to each consumer in a multi-chassis router can be significantly more difficult than in a standalone router.

SUMMARY

Techniques are described for providing push-based hierarchical state propagation within a multi-chassis network device. For example, a multi-chassis router may include a master routing engine within a control chassis of the multi-chassis router and local routing engines within other chassis of the multi-chassis router. The multi-chassis router may include a central switch card chassis (SCC) having master routing engine and one or more line card chassis (LCCs) each having one or more local routing engines. The local routing engines forward state information received from router resources within their chassis to the master routing engine without substantially processing or recognizing the state information. The master routing engine within the control node (e.g., the SCC) manages state information for the entire multi-chassis router and propagates the state information to each local routing engine for distribution to consumers within the respective chassis. The master routing engine also provides state information for consumers within the SCC.

The local routing engines provide updates to the consumers by notifying the consumers of the availability of the update. A consumer responds to this notice by retrieving the update from the local routing engine. After retrieving the update from the local routing engine, a consumer sends an acknowledgement for the update to the local routing engine. Once each consumer which requires a state update from the local routing engine has sent an acknowledgement to the local routing engine, the routing engine sends an acknowledgement of the state update to the master routing engine, thereby indicating the state update has been properly processed for the respective chassis. In this manner, state updates are pushed through a routing engine hierarchy to each consumer within the multi-chassis router.

In one embodiment, a multi-chassis network device comprises a routing engine for a first chassis, a routing engine for a second chassis and a consumer. The routing engine of the second chassis operates as an intermediate consumer to the routing engine of the first chassis. The routing engine of the second chassis receives a state update from the routing engine of the first chassis and provides the state update to the consumer.

In another embodiment, a method for distributing a state update in a multi-chassis network device comprises receiving with an intermediate consumer within a first chassis a state update from a control unit from a second chassis of the multi-chassis network device and providing the state update from the intermediate consumer within the first chassis to a consumer within the first chassis.

In an embodiment, a computer-readable medium containing instructions that cause a programmable processor in a multi-chassis network device to receive with an intermediate consumer within a first chassis a state update from a control unit from a second chassis of the multi-chassis network device and provide the state update from the intermediate consumer within the first chassis to a consumer within the first chassis.

Embodiments of the invention may provide one or more of the following advantages. As compared to a multi-chassis router including a master control node that communicates directly with all consumers in the multi-chassis router, embodiments of the invention reduce the amount of control plane data traffic between chassis of the multi-chassis router. Instead of requiring state updates to be separately sent to each consumer on a chassis, the state updates can be distributed to each chassis only once. This not only reduces control plane data traffic, but also reduces convergence time, i.e., the time it takes for all consumers to consume a state update. As compared to a pull-based hierarchical system, embodiments of the invention allow consumers to receive state updates without having to poll for them, which reduces the amount of communication between a control node and consumers required to distribute state information updates. Thus, embodiments of the invention allow system resources to be preserved for other operations.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
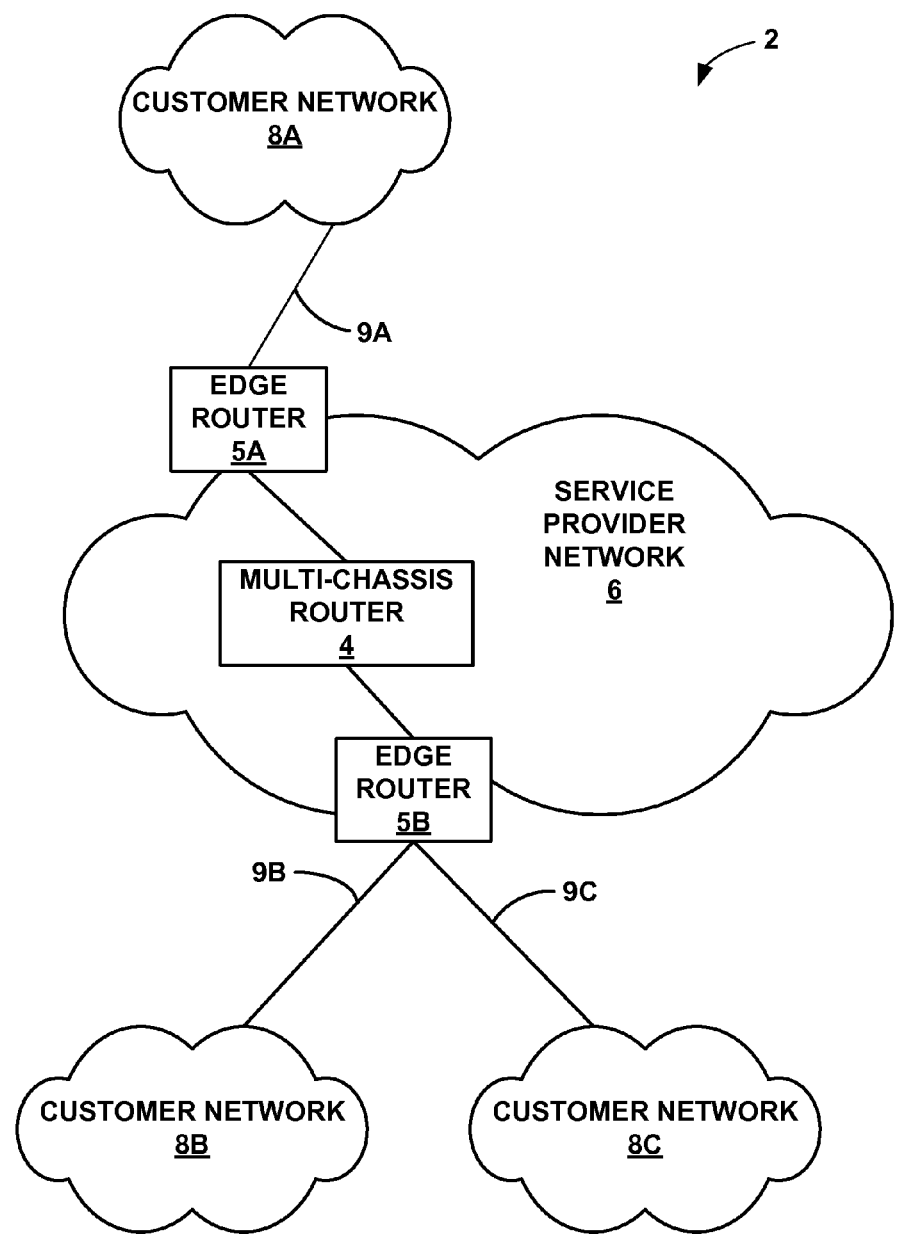
FIG. 1 is block diagram of an example computing environment in which a service-provider network includes a multi-chassis router.

FIG. 1 is a block diagram illustrating an example computing environment 2 in which service provider network 6 includes a multi-chassis router 4. In this example, multi-chassis router 4 communicates with edge routers 5A and 5B ("edge routers 5") to provide customer networks 8A-8C ("customer networks 8") with access to network 6. In one embodiment, multi-chassis router 4 includes an SCC that operates as a control node and one or more line card chassis LCCs that operate as packet routing devices. The LCCs may contain all the physical interfaces for coupling to other devices within network 6, while the SCC controls and routes traffic between the LCCs.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. Service provider network 6 may include a variety of network devices other than multi-chassis router 4 and edge routers 5, such as additional routers, switches, servers, or other devices.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, or other devices. The configuration of network 2 illustrated in FIG. 1 is merely exemplary. For example, service provider network 6 may be coupled to any number of customer networks 8. Nonetheless, for ease of description, only customer networks 8A-8C are illustrated in FIG. 1.

Consistent with the principles of the inventions, multi-chassis router 4 provides for failover by including a primary routing engine as well as one or more standby routing engines. For example, an SCC may contain primary and standby master routing engines, and one or more LCCs may contain primary and standby local routing engines. State information is pushed downward from the primary master routing engine to the standby master engine prior to forwarding the state information to the primary local routing engines in the LCCs. Similarly, the primary local routing engines forward the state information to one or more standby local routing engines prior to forwarding the state information to "consumers" within their chassis. In this manner, multi-chassis router 4 enforces a synchronization gradient when communicating state information throughout the multi-chassis environment. In the event a primary routing engine fails, a standby routing engine in the same chassis assumes control over routing resources and routing functionality for that chassis. Moreover, because state information is delivered to a standby routing engine prior to forwarding the state information to a consumers, a standby routing engine can take up forwarding state information to consumers at the same place where the primary routing engine left off. U.S. patent application Ser. No. 10/678,280 titled "Syncronizing State Information Between Control Units", filed Oct. 3, 2003, describes techniques for a synchronization gradient within a standalone router and is hereby incorporated by reference.

In this manner, the primary and standby routing engines synchronize their respective state information to allow the standby routing engine to assume control of the router resources without having to relearn state information. For exemplary purposes, the principles of the invention will be described in reference to multi-chassis router 4. However, the principles of the invention are applicable to any multi-chassis network device. For example, the principles of the invention could be applied to edge routers 5, enterprise appliances, session border controllers, intelligent switches or hubs, firewalls or any other network device having a multi-chassis operating environment.

As described in further detail below, operating systems executing within the primary and standby routing engines of multi-chassis router 4 manage data structures and inform consumers of any change to the state information. Consumers may comprise software processes executing within components of multi-chassis router 4, such as chassis management processes, configuration management processes, or other processes in multi-chassis router 4. Additionally, consumers of the state information may comprise hardware components, or combinations of software, hardware or firmware, such as one or more forwarding engines, IFCs or other hardware. It should be noted that, as to the master routing engine, the local routing engines are viewed as consumers with respect to state information. Similarly, as to local components within the LCCs, the local routing engines are providers of state information. Because of their dual role, the local routing engines may be viewed as intermediate consumers. Likewise, the standby routing engines in the SCC and the LCCs also operate as consumers as to the primary routing engines until taking over state information forwarding, e.g., in event of a failover.

Multi-chassis router 4 may manage state information within a hierarchically-ordered and temporally-linked data structures. One example of the use of hierarchically-ordered and temporally-linked data structures is described in U.S. patent application Ser. No. 10/457,814 titled "Managing State Information in a Computing Environment" by David M. Katz and Dennis C. Ferguson, filed Jun. 9, 2003, hereby incorporated by reference in its entirety.

During normal operation, in the event state information changes, the primary master routing engine of a control node of multi-chassis router 4 (i.e., the SCC in this example) synchronizes state information with operating systems executing on the one or more standby master routing engines. Specifically, the primary master routing engine replicates the state updates and transmits the state update in message form to the standby master routing engines. The standby master routing engines receive the message and update their corresponding data structures to record the state updates.

Upon recording the state updates, the standby master routing engines may transmit an acknowledgement to the primary master routing engine to indicate successful state information synchronization. Once the primary master routing engine has received an acknowledgement from the standby master routing engines, it forwards the state information changes to the consumers of the SCC. For example, this includes any consumers located within the SCC. In addition, the primary master routing engine forwards the state information to the primary local routing engines on the LCCs, which are viewed as consumers to the primary master routing engine. The primary local routing engines then forward the state update information to one or more standby local routing engines on the LCCs. However, each LCC is not required to have a standby local routing engine, and some or all of the LCCs may only have a primary local routing engine. After receiving an acknowledgement from each standby local routing engine on that LCC, a primary local routing engine may then transmit the state update messages to consumers on the LCC.

In this manner, multi-chassis router 4 enforces the requirement that the standby master routing engines are updated with state information changes before consumers, and that the standby routing engines of the individual chassis are updated with the state information before any local consumers within the individual chassis. Therefore, if any of the primary routing engines fail, a corresponding standby routing engine can readily assume routing and state management functionality if needed. Once one of the standby routing engines assumes control that standby routing engine is no longer a standby routing engine, but becomes a primary routing engine; however, that routing engine will maintain its functional status as either a local or a master routing engine. In this regard, multi-chassis router 4 can be viewed as maintaining a "synchronization gradient" such that the primary master routing engine of the control node (i.e., the SCC) receives state updates first, followed by the standby master routing engines, and followed by consumers of the SCC including the primary local routing engines of the other chassis, followed by standby local routing engines, followed by the consumers within the other chassis. This synchronization gradient ensures that upon failover, a standby routing engine within any of the chassis contains enough state information to assume control of the router resources without having to relearn a substantial portion of the state information.

In some embodiments, the primary master and primary local routing engines may use commit markers and commit proposals within their data structures to track the state updates given to consumers. As further described below, a commit marker may be inserted into the state update data structure after the most recent object within the temporally-ordered data structure which a consumer has acknowledged receiving. A commit proposal may be inserted into at a point in the state update date chain to indicate an acknowledgement request has been sent for all state update information up to that point in the chain. The primary master and primary local engines also replicate the position of commit markers and commit proposals within their data structure to the standby master and standby local routing engines. In this manner the standby routing engines also know which state updates have been received by which consumers.

In response to the state update messages from a local routing engine, consumers issue requests to retrieve the updated state information. When the primary local routing engine receives such a request, the primary local routing engine traverses the hierarchically-ordered and temporally-linked data structure and issues state update messages to the requesting consumers. The primary local routing engine then updates respective commit markers and commit proposals associated with the requesting shared consumers to reflect transmission of the state updates. The primary local routing engine again synchronizes state information with the one or more standby local routing engines so that the commit markers and commit proposals within the state information maintained by the local routing engines on a chassis are uniform.

In this manner, one of the standby local routing engines may assume control of a chassis, and can deterministically identify the state information of which each consumer on that chassis has already been informed, i.e., consumed. As a result, the standby local routing engines may need only update the consumers with limited amount of state information, and need not rely on relearning state information from the master routing engine of multi-chassis router 4. Once one of the standby local routing engines assumes control of a chassis that standby local routing engine is no longer a standby local routing engine, but becomes a primary local routing engine.

The combination of failover techniques for the local routing engines and the master routing engine extends a synchronization gradient for a standalone router for use in multi-chassis router 4. The failure of a single routing engine in multi-chassis router 4 will not interrupt packet-forwarding and state information updates can be resumed with limited interruption and redundancy. In this manner, multi-chassis router 4 has a non-stop forwarding capability equivalent to non-stop forwarding in a standalone router.

Figure 2:
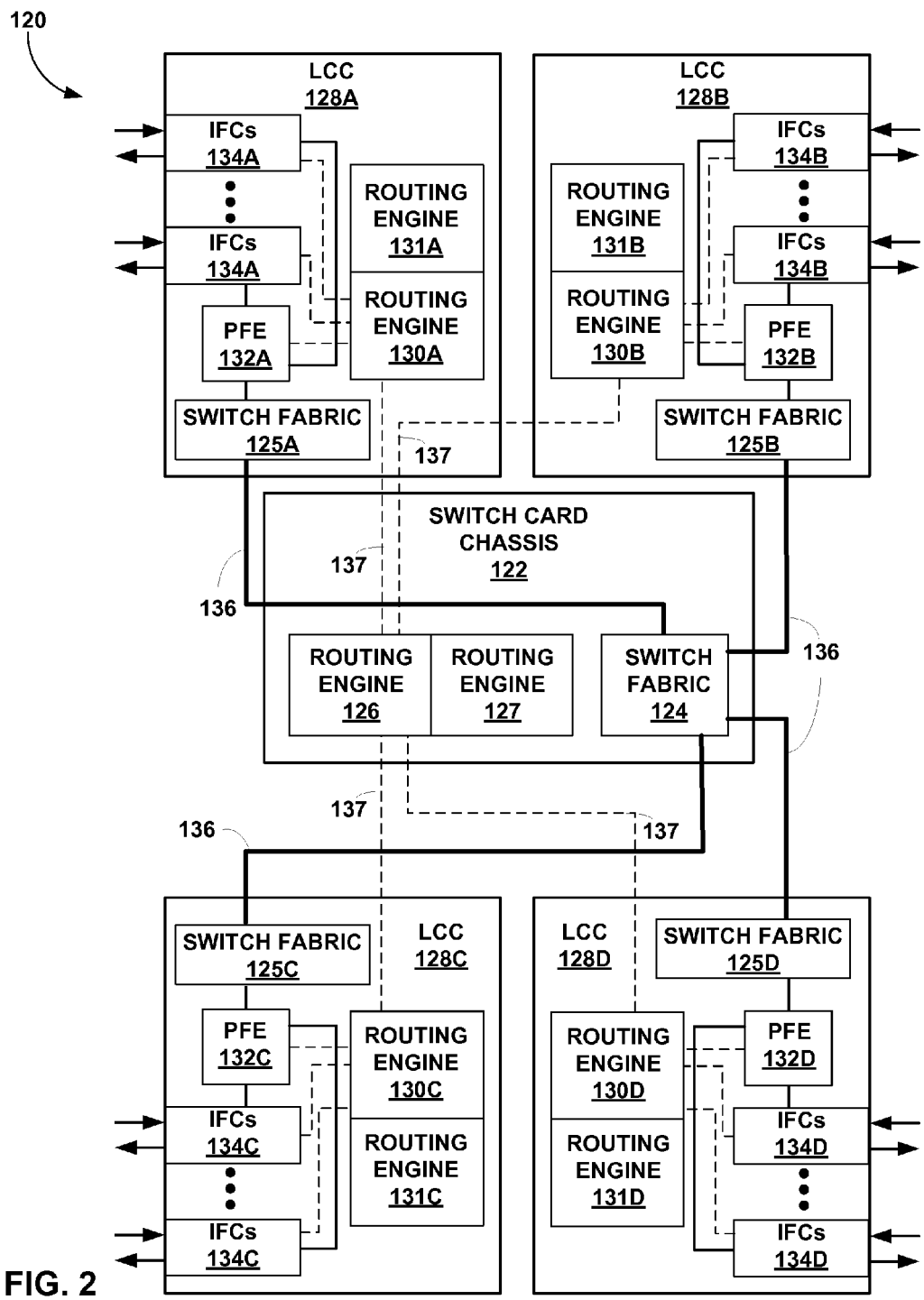
FIG. 2 is a block diagram illustrating an exemplary multi-chassis router consistent with the principles of the invention.

FIG. 2 is a block diagram illustrating an exemplary multi-chassis router 120 that operates consistent with the principles of the invention. Multi-chassis router 120 routes data packets between network devices across a network. In this example, multi-chassis router 120 comprises four substantially identical LCCs 128A-128D ("LCCs 128") and SCC 122 that operates as a central control node. In other embodiments, a multi-chassis router may include more or less LCCs. SCC 122 provides centralized switching and control for multi-chassis router 120. LCCs 128 provide interfaces to a network using IFC sets 134A-134D ("IFCs 134").

SCC 122 includes switch fabric 124 and two routing engines: primary master routing engine 126 and standby master routing engine 127. Switch fabric 124 provides a backside connection, i.e. a connection separate from the network, between switch fabric 125 of LCCs 128. Functions of primary master routing engine 126 include maintaining routing information to describe a topology of a network, and using that information to derive forwarding information bases (FIBs). Routing engine 126 controls packet forwarding throughout multi-chassis router 120 by installing an FIB in LCCs 128 via communication with local routing engines 130 and/or 131 over cables 137. An FIB for one of LCCs 128 may be the same or different than an FIB for other LCCs 128 and SCC 122. Because cables 137 provide a dedicated connection, i.e., separate from a data packet forwarding connection provided by cables 136, between SCC 122 and LCCs 128, FIBs in LCC routing engines 130 can be updated without interrupting packet forwarding performance of multi-chassis router 120. LCCs 128 each contain one of primary local routing engines 130A-130D ("routing engines 130"), one of standby local routing engines 131A-131D ("routing engines 131"), one of switch fabrics 125A-D ("switch fabric 125"), at least one packet forwarding engine (PFE), shown as PFEs 132A-132D ("PFEs 132"), and one or more IFCs 134.

Multi-chassis router 120 performs routing functions in the following manner. An incoming data packet is first received from a network by one of IFCs 134, e.g., 134B, which directs it to one of PFEs 132, e.g., PFE 132B. The PFE then determines a proper route for the data packet using the FIB provided by the primary local routing engine, e.g., routing engine 130B. If the data packet is destined for an outbound link associated with the one of IFCs 134 that initially receive the packet, the PFE forwards the packet to the outbound link. In this manner, packets sent out by the same PFE on which they were received from the network bypass switch fabric 124 and switch fabric 125.

Otherwise, the PFE sends the data packet to switch fabric 125, where it is directed to switch fabric 124, where it follows a route to one of the other PFEs 132, e.g., PFE 132D. This PFE, e.g., PFE 132D, sends the data packet across the network via one of IFCs 134, e.g., IFC 134D. Thus an incoming data packet received by one of LCCs 128 may be sent by another one of LCCs 128 to its destination. Other multi-chassis routers that operate in a manner consistent with the principles of the invention may use different switching and routing mechanisms.

As described with respect to multi-chassis router 4 in FIG. 1, in some embodiments, primary master routing engine 126 forwards state information updates to consumers using a hierarchically-ordered and temporally-linked data structure according to a synchronization gradient. With respect to primary master routing engine 126, standby master routing engine 127 and primary local routing engines 130 are consumers.

Standby master routing engine 127 is substantially similar to primary master routing engine 126. For example, standby master routing engine 127 may include the same hardware and operating system and other software applications as primary master routing engine 126. If primary master routing engine 126 fails or is taken off-line, standby master routing engine 127 carries on the functions of primary master routing engine 126. In this example, if primary master routing engine 126 comes back on-line, it could either serve as a standby master routing engine subservient to routing engine 127 now acting as a primary, or resume operation as the primary master routing engine of SCC 122. In either situation, at any one time, only one of primary master routing engine 126 and standby master routing engine 127 provides control of multi-chassis router 120.

Primary local routing engines 130 control and manage LCCs 128, but are subservient to primary master routing engine 126 of SCC 122. For example, after receiving state information updates from primary master routing engine 126, primary local routing engines 130 forward the state information update to consumers on LCCs 128 using the hierarchically-ordered and temporally-linked data structure. For example, consumers that receive state information updates from primary local routing engines 130 include standby local routing engines 131, PFEs 132 and IFCs 134. Primary local routing engines 130 also distribute the FIB derived by primary master routing engine 126 to PFEs 132.

Standby local routing engines 131 may be substantially similar to primary local routing engines 130. For example, standby local routing engines 131 may include the same hardware and operating system and other software applications as primary master routing engine 126. If one of primary local routing engines 130 fails or is taken off-line, the corresponding standby local routing engines 131 would carry on the functions of the failed one of routing engines 130. For example, assume primary local routing engine 130B of LCC 128B fails. In this case, standby local routing engine 131B takes over control of LCC 128B. As a result, standby local routing engine 131B begins forwarding state information updates to consumers on LCC 128B. In this example, if routing engine 130B were to come back on-line, the routing engine could either serve as a standby local routing engine to standby local routing engine 131B or resume control of LCC 128B. In either case, at any one time, only one of primary local routing engine 130B and standby local routing engine 131B provide control of LCC 128B. While LCCs 128 are shown with exactly one of standby local routing engines 131, in other embodiments, some of LCCs 128 may operate without a standby local routing engine 128 or include more than one of standby local routing engines 128.

In some embodiments, operating systems executing on the primary and standby routing engines of each chassis encode commit markers and commit proposals within the hierarchically-ordered and temporally-linked data structures, which are used to track the distribution of the state information to the various consumers within multi-chassis router 120. In particular, in some embodiments, the operating systems executing on the primary and standby routing engines of each chassis maintain a commit marker and a commit proposal to track the consumption of state information for each consumer associated with a shared router resource. A shared router resource, as referred to herein, is any router resource, such as a PFE or other consumer, that is shared by both the primary routing engine and the one or more of the standby routing engines on a chassis. For example, primary master routing engine 126 encodes commit markers and commit proposals for standby master routing engine 127 as well as each of primary local routing engines 130. Primary local routing engines 130 contain commit markers only for consumers on the same chassis. For example, primary local routing engine 128A contains a separate commit marker for each of standby local routing engine 131A, PFE 132A and IFCs 134A, each of which reside on LCC 128A. In contrast, primary and standby routing engines may each contain their own software processes or daemons, which also operate as consumers of state information. In some embodiments, routing engines do not include commit markers or commit proposals for non-shared router resources.

A commit marker may be used to mark the last state update received and acknowledged by the shared consumer, while a commit proposal for a consumer indicates a position in a state update corresponding to a request for acknowledgement sent to the consumer. Consequently, the commit marker and commit proposal may be a pointer, status bit, or other data structure capable of marking a location within the hierarchically-ordered and temporally-linked data structure.

In order to be capable of assuming control of state information updates, the standby routing engines also encode the commit markers and commit proposals into their data structure. The standby local routing engines encode a copy of the commit markers encoded in the corresponding primary local routing engine, except for its own commit marker, into its own data structure. By encoding the commit markers and commit proposals within the data structure, standby routing engines 127 and 130 can precisely determine the extent to which consumers have been updated with state information in the event of a failover. As a result, standby routing engines 127 and 130 need only update each consumer with a limited amount of the state information that is bounded by its respective commit markers and commit protocols encoded within the state information data structure.

Primary routing engines 126 and 130 may also encode a separate status bit marker on each object in their state information update chains. The status bit markers may be used to indicate that the corresponding standby routing engine has indeed received that object. These status bit markers may be used in addition to the commit marker and commit proposal for the standby routing engine. As described, a primary routing engine first provides an object in the state information chain to a corresponding standby routing engine. Once the standby routing engine acknowledges receipt of an object in the data chain, that object is marked with the status bit marker and released to other consumers, such as lower level routing engines of other chassis or local consumers. The status bit marker may be necessary, for example, when a routing engine is first operating without a standby routing engine and then a standby routing engine comes online. The status bit marker forces the primary operating system to allow the standby routing engine to catch-up on state information updates within memory of the primary routing engine immediately, so that the standby routing engine becomes ready to take over state information updates as soon as possible once activated. In this manner, maintaining a status bit marker ensures that a standby routing engine receives state updates before any other consumer. This is required so to allow a standby routing engine to resume state update from wherever the primary routing engine left off in a failover.

When there is not an active corresponding standby routing engine, a primary routing engine does not use the status bit marker or wait for a standby routing engine to acknowledge receipt of an object before providing it to other consumers. While the status bit marker is described as such, it may also be a pointer or other data structure capable of marking state information objects. A status bit marker is merely an example embodiment.

Although described in reference to a two-level multi-chassis router 120, the principles of the invention may readily be applied to a multi-chassis router having three or more levels (tiers) of routing control. For example, each of local routing engines 131 of LCCs 128 of multi-chassis router 120 may operate as master routing engines over one or more additional chassis having primary local and standby routing engines. The techniques for ensuring the synchronization gradient for distributing state information may be applied to ensure that standby routing engines at any level are able to take over control for respective primary routing engines in the event of a failure.

Figure 3:
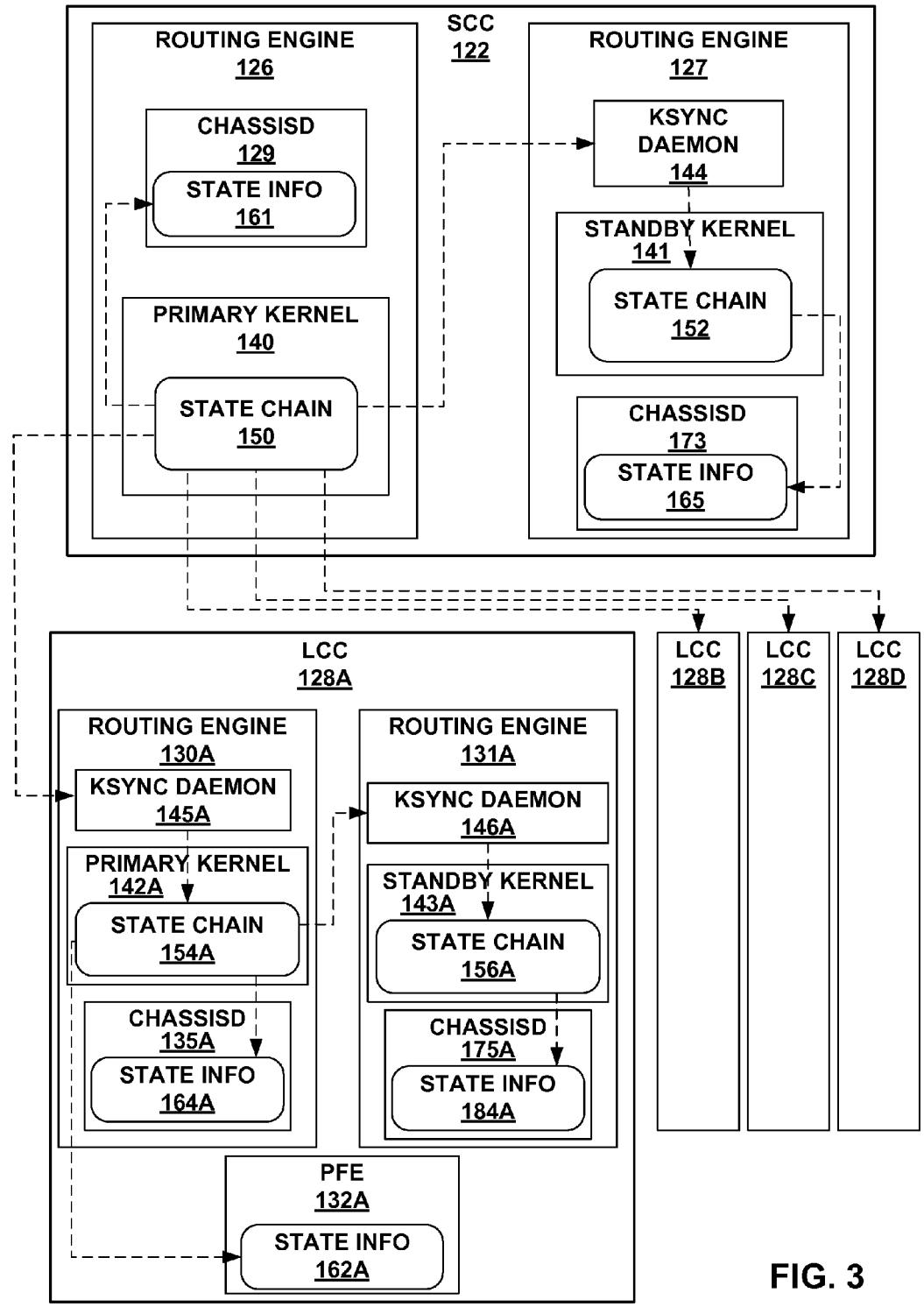
FIG. 3 is a block diagram illustrating an exemplary control plane of the multi-chassis router of FIG. 2 consistent with the principles of the invention.

FIG. 3 is a block diagram illustrating an exemplary control plane of multi-chassis router 120 in accordance with principles of the invention. As shown, SCC 122 includes primary master routing engine 126 and standby master routing engine 127. Each of LCCs 128 include one of primary local routing engines 130 and one of standby local routing engines 131, but for illustrative purposes, this detail is only shown on LCC 128A as primary local routing engine 130A and standby local routing engine 131A. LCCs 128B-D may be substantially similar to LCC 128A.

As described with respect to FIG. 2, routing engines 126, 127, 130 and 131 may maintain state information according to a hierarchically-ordered and temporally-linked data structure in a state chain. A portion of a state chain may represent, for example, the interface between multi-chassis router 120 and the network, which may include the current configuration of IFCs 134 and PFEs 132. State chains 150, 152, 154A and 156A may be stored in memory, such as RAM, located on respective routing engines 126, 127, 130A, 131A or external to respective routing engines 126, 127, 130A, 131A.

The state information on routing engines 126, 127, 130 and 131 is referred to as a "state chain" because the information is propagated to routing engines 126, 127, 130 and 131 according to the temporal links in the data, i.e., state objects are distributed to routing engines 127 and 130 in the order they are received by primary master routing engine 126. Likewise, primary local routing engines 126 forward the state information objects to standby local routing engines 127 using the same first-in-first-out methodology. In contrast, the hierarchical order of the state information is used when a consumer requires state information update to be provided in a certain order. For example, chassis daemon ("chassisd") 129 may require any available state information updates regarding PFE 132A prior to receiving a state information update regarding IFCs 134A. However, generally, consumers receive state updates in a temporary order unless a state has a dependency on another state. Each consumer may have unique dependencies for receiving state information. For example dependencies could be the result of required state information for a consumer.

Consumers also maintain state information. For example, FIG. 3 shows chassisd 129, chassisd 173, PFE 132A, chassisd 135A and chassisd 175A maintaining state information 161, 165, 162A, 164A and 184A respectively. State information 161, 165, 162A, 164A and 184A may, for example, represent the current state of field replaceable units, such as interface cards, encryption cards, accounting service cards, and the like. Again, state information 161, 165, 162A, 164A and 184A may be stored in memory, such as RAM, located within or external to the shared consumers. As examples, FIG. 3 shows shared consumers PFE 132A and shared intermediary consumers LCCs 128. FIG. 3 also shows non-shared consumers chassisd 129, chassisd 173, chassisd 135A and chassisd 175A. Multi-chassis router 120 also includes additional shared and non-shared consumers not shown in FIG. 3 that require state information, e.g., IFCs 134.

Because routing engines 126, 127, 130 and 131 push state data to consumers as the state information changes, rather than requiring consumers to poll for the updated state information, control plane data traffic and convergence time.

In order to prevent overloading of a consumer in the event of a large number of state updates, consumers are informed of a state update and then allowed to retrieve it once the consumer's resources allow it. In some embodiments, some consumers may be serviced indirectly by a proxy in the routing engine. For example, primary master routing engine 126 may include a proxy for each of LCCs 128. Other consumers may directly retrieve state information from state chain 150. For example, non-shared consumers, e.g., Chassisd 129, may directly retrieve state information from state chain 150.

To illustrate the process of state information updates in multi-chassis router as shown in FIG. 3, assume primary master and primary local routing engines 126 and 130 are in control and standby master and standby local routing engines 127 and 131 are serving as back-ups. Primary master routing engine 126 receives event messages indicative of a change in the state of the shared resource, e.g., PFE 132A. When primary master routing engine 126 receives an event message, primary master kernel 140 in primary master routing engine 126 updates state chain 150 by reconfiguring the data structure and updating the data stored within the data structure. In addition to updating the data based on the change of state, primary master kernel 140 may add, delete or move commit markers and/or commit proposals to various positions within the data structure in the event that the event message relates to the state of a shared routing resources, e.g., PFE 132A.

Primary master kernel 140 then replicates the state update by transmitting the state information in message form to ksync daemon 144, a state synchronization process executing on standby master routing engine 127. Primary master kernel 140 may also send an acknowledgement request to standby master routing engine 127 and may also move the commit proposal representing standby master routing engine 127 on state chain 150. Ksync daemon 144 extracts the state information and transmits the state information to standby master kernel 141. Standby master kernel 141 receives this state update and updates state chain 152 in accordance with the state update.

Similar to primary master kernel 140, standby master kernel 141 may reconfigure and update the data structures of state chain 152 based on the state information. Standby master kernel 141 may also add, delete or move commit markers and/or commit proposals to various positions within these data structures. After being updated, state chain 152 is substantially similar to state chain 150. In other words, state chain 152 and state chain 150 are synchronized. If an acknowledgement request was sent by primary master kernel 140, standby master kernel 141 transmits an acknowledgement to primary master kernel 140 via ksync daemon 144 to indicate this synchronized state. In this manner, ksync daemon 144 provides an interface between primary master kernel 140 and standby master kernel 141 that allows for the synchronization of state information. Upon receiving the acknowledgement, if any, indicating the synchronized state in standby master routing engine 127, primary master kernel 140 moves its commit marker representing standby master routing engine 127 to the current location of the commit proposal in master routing engine 127. Primary master kernel 140 then marks each of the objects represented by the acknowledgement from standby master routing engine 127 with a status bit marker to allow distribution of the state information to LCCs 128 and consumers on SCC 122. The status bit marker ensures that state information distributed from state chain 150 to other consumers has first been received by standby master routing engine 127.

Standby master routing engine 127 then updates state information in its internal daemons. For example, standby master routing engine 127 updates state information 165 in chassisd 173 in substantially the same manner as primary master routing engine 126 updates state information 161 in chassisd 129.

Once standby master routing engine 127 is synchronized with primary master routing engine 126, primary master routing engine 126 provides state information updates as necessary to various consumers within SCC 122. For example, primary master kernel 140 may issue alerts to chassisd 129 to indicate a change in state information 160. In response, primary master kernel 140 receives requests from the consumers for state information. Primary master kernel 140 services each request by traversing the hierarchically-ordered and temporally-linked data structure of state chain 150 and issuing update messages to the requesting consumer. Primary master kernel 140 generates the update messages to contain state information that the consumer has not already received based on the respective commit proposal and commit marker for the consumer. The consumers respond to acknowledge receipt of the state data up to an acknowledgement request from primary master kernel 140. Upon updating the consumers and receiving their acknowledgements, primary master kernel 140 moves commit markers within the data structure of state chain 150 to reflect the updates.

After standby master routing engine 127 is synchronized with primary master routing engine 126, primary master kernel 140 again replicates the state update by transmitting the state information in message form to ksync daemons 145, one in each of primary local routing engines 130, as represented by ksync daemon 145A. As state updates occur, primary master kernel 140 may also send an acknowledgement request once it reaches a commit proposal in the state chain. The position of commit proposal in the state chain may not be consistently spaced. For example, the position of commit proposals for a consumer may depend on time lapsed since a previous commit proposal or other variable.

Ksync daemons 145 extract the state information and transmit the state information to primary kernels 142, as represented by primary local kernel 142A. Primary kernels 142 receive this state update and update state chains 154, as represented by state chain 154A, in accordance with the state update. In addition to updating state chain 154A with the state update information, primary local kernel 142A adds an additional object referred to as a "ksync object" corresponding to an acknowledgement request received from primary kernel 140 to state chain 154A. The ksync object on state chain 154A is required to remind primary kernel 142A to respond to the acknowledgement request made by master routing engine 126 once the state update has replicated to all consumers that require it on LCC 128A. This is because primary kernel 142A must wait until primary kernel 142A receives acknowledgements from all consumers on LCC 128A that require the state update before providing an acknowledgement for the state update to master routing engine 126.

After being synchronized with state chain 150, state chains 154 differ from state chain 150 in that primary local kernels 142 encode different sets of commit markers and commit proposals within each of state chains 154. Each of state chains 154 contains its own set of commit markers and commit proposals, which represent consumers on their particular chassis. For example, primary local kernel 142A will encode a separate commit marker for each of standby local routing engine 128A, PFE 132A and IFCs 134A.

Once primary local routing engines 130 are synchronized with primary master routing engine 126, they replicate the state update to standby local routing engines 131 by transmitting the state information in message form to ksync daemons 146, represented by ksync daemon 146A. Ksync daemon 146A extracts the state information and transmits the state information to standby local kernel 143A. Standby local kernel 143A receives this state update and updates state chain 156A in accordance with the state update. Once standby local kernel 143A has updated state chain 156A, if requested, it acknowledges receipt of the state update to primary local kernel 142A.

Upon receipt of the acknowledgement, primary local kernel 142A moves the commit marker representing standby local routing engine 131A to the commit proposal and marks all state objects in state chain 154A between the commit marker and commit proposal with a status bit marker signifying that the objects are available to be replicated to consumers on LCC 128A.

Primary local kernel 142A issues alerts to consumers on LCC 128A that require the state updates represented by one or more objects in state chain 154A. In response, the consumers request state information and primary kernel 142 services those requests by traversing the hierarchically-ordered and temporally-linked data structure of state chain 154A and issuing update messages to the requesting consumer.

Once each commit marker on LCC 128A passes a ksync object in state chain 154A, primary local kernel 142A responds to the acknowledgement request form primary master kernel 140. Primary master kernel 140 then moves the commit marker for LCC 128A within state chain 150 to the commit proposal for LCC 128A.

The described processes for distribution of state update information on multi-chassis router 120 may be performed when new state information is created or at defined time intervals. State updates occur often in multi-chassis router 120, and synchronization may occur continuously or nearly continuously. Because synchronization does not occur instantaneously, multi-chassis router 120 may perform multiple iterations of state updates simultaneously. For example, primary master kernel 140 may simultaneously update primary kernels 142 in primary local routing engines 130 with a first state update while updating standby master kernel 141 in standby master routing engine 127 with a second state update because standby master kernel 141 has already acknowledged the first state update.

Synchronization of state information in state chains 150, 152, 154 and 156 continues in this manner until a failover occurs. Failover may occur for primary master routing engine 126 and/or for any of primary local routing engines 130. Once a failover occurs, the standby routing engine corresponding to the failed primary routing engine assumes the responsibilities of the primary routing engine. For example, if failover occurs while a primary master routing engine 126 is updating primary local routing engines 130, standby master routing engine 127 resumes the updates. In particular, standby master kernel 141 uses the commit markers and commit proposals stored and synchronized within state chain 152 to continue the updates from the same point that primary master kernel 140 left off.

In the event of a failover in one of LCCs 128, e.g. LCC 128A, standby local routing engine 131A resumes updating consumers on LCC 128A. Standby local routing engine 131A operates without a back-up routing engine until primary local routing engine 130A comes on-line. Because there is no back-up, upon receiving a state update, standby local routing engine 131A does not maintain a status bit marker to signify an object has been acknowledged by a standby routing engine. Instead, standby local routing engine 131A immediately updates consumers.

Standby local routing engine 131A begins sending state updates from the hierarchically-ordered and temporally-linked data structures of state chain 156A from the commit markers corresponding to each consumer. For example, standby local routing engine 131A reaches a commit marker corresponding to PFE 132A. Then, standby local routing engine 131A issues state update messages to PFE 132A. PFE 132A begins receiving state objects in state chain 162A that follow its commit marker. PFE 132A may receive redundant state update messages if primary local routing engine 130A sent the same state update message but failed prior to receiving an acknowledgement from PFE 132A. In this case, PFE 132A ignores the redundant state update message other than to respond to an acknowledgement request regarding the redundant state update.

Standby master routing engine 127 maintains state chain 152 to be synchronous with state chain 150 of primary master routing engine 126. Standby local routing engines 131 maintain state chains 156 to be synchronous with state chains 154 of primary local routing engines 130. Therefore, standby routing engines 127 and 131 may facilitate failover by assuming control without having to learn state information updates, e.g., by restarting the chassis, or even multi-chassis router 120 from a known state. Moreover, standby routing engines 127 and 131 can update the consumers with regard to the limited amount of the state information bounded by their respective commit markers and commit proposals encoded within the state information data structure.

As described, in the event of a failover, one or more standby routing engines 127 and 131 assumes the role of a primary routing engine. Later, the primary routing engine may return to an operational status, e.g., after being reset, and assume the role of a standby routing engine. In this case, the primary routing engine initiates a state synchronization process to synchronize its state information with state information of the standby routing engine, now operating as the primary routing engine.

Routing engines 126, 127, 130 and 131 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of multi-chassis router 120 may be implemented by executing the instructions of the computer-readable medium with one or more processors, discrete hardware circuitry, firmware, software executing on a programmable processor, or combinations thereof.

Figure 4A:
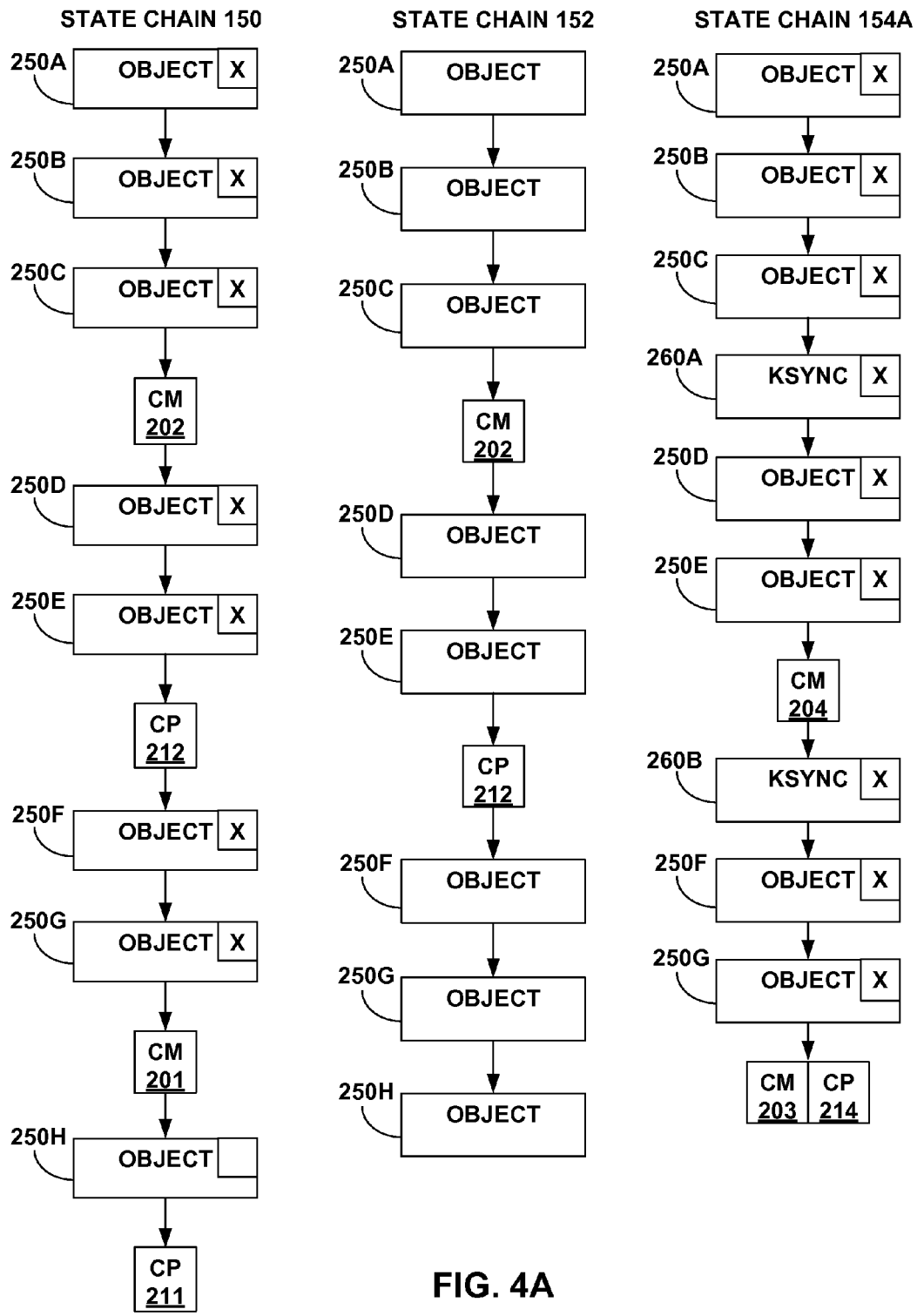
FIGS. 4A and 4B are block diagrams illustrating an example data structure in for maintaining state information within a multi-chassis router.
Figure 4B:
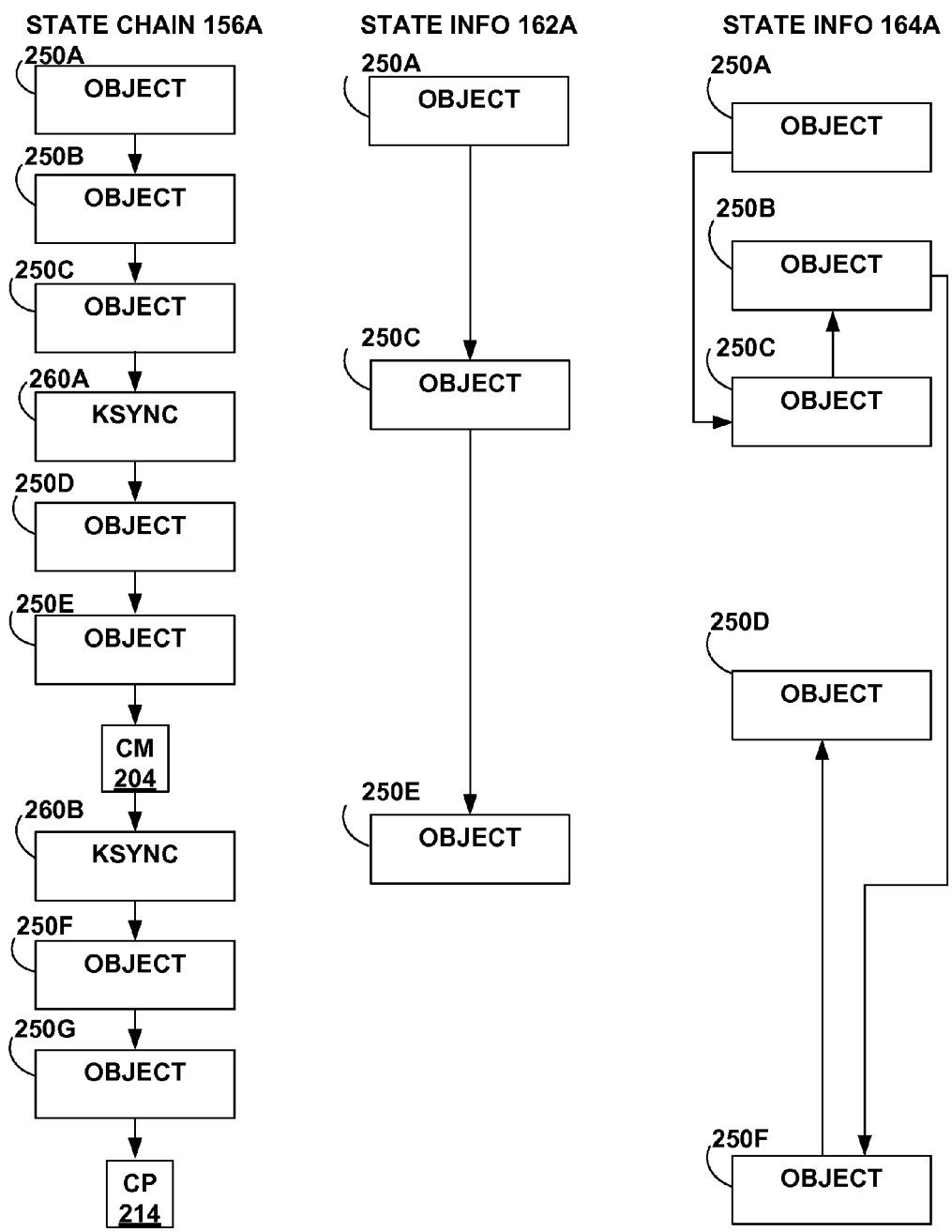

FIGS. 4A and 4B ("FIG. 4") are block diagrams illustrating exemplary propagation of state updates to state chains 150, 152, 154A, 156A, 162A and 164A in primary master routing engine 126, standby master routing engine 127, primary local routing engine 130A, standby local routing engine 131A, PFE 132A and chassisd 135A respectively. As illustrated, state information may be stored within multiple objects 250. As state updates occur, new objects are created and distributed to the routing engines and shared consumers on multi-chassis router 120. Moreover, objects 250 may be propagated to routing engines 126, 127, 130 and 131 according to the temporal-links in the data structure. Objects 250 may store information corresponding to routes, firewalls, interface cards, and other components.

As shown in FIG. 4A, primary master kernel 140 in primary master routing engine 126 maintains state information in the form of state chain 150 including objects 250A-250H, as illustrated in FIG. 4A. Primary master kernel 140 associates commit marker 201 and commit proposal 211 with standby master routing engine 127. Commit proposal 212 and commit marker 202 correspond to primary local routing engine 130A. State chain 150 may contain additional commit markers and commit proposals (not shown) for primary local routing engines on each of LCCs 128B-128D. State chain 150 may additionally include commit markers and commit proposals (not shown) for shared consumers on SCC 122.

Standby master kernel 141 also maintains state chain 152 including objects 250A-250H. State chain 152 is synchronized with state chain 150. Objects on state chain 150 include a status bit marker to indicate whether that object has been received by standby master routing engine 127. As shown in FIG. 4A, objects 250A-250G in state chain 150 are marked as having been added to state chain 152. While state chain 152 currently includes object 250F, standby master routing engine 127 has not yet acknowledged receipt of object 250F and will do so in response to commit proposal 211. Until then, object 250F in state chain 150 is not marked as having been received by standby master routing engine 127.

With reference to FIG. 4A, state chain 152 is substantially similar to state chain 150, and is in the process of being synchronized with state chain 150 and includes all objects in state chain 150. State chain 152 includes commit marker 202 and commit proposal 212 corresponding to primary local routing engine 130A. State chain 152 includes additional commit markers and commit proposals (not shown) that are part of on state chain 150, except for commit marker 201 and commit proposal 211, which correspond to standby local routing engine 127. In contrast to state chain 150, objects on state chain 152 do not include a status bit marker to show if a standby master routing engine has received each object. In the event that standby master routing engine 127 becomes the primary master routing engine and is backed-up by another routing engine serving as a standby master routing engine, status bit markers would then be added to each object in state chain 152.

State chain 154A is maintained by primary local routing engine 130A in LCC 128A, and is representative of state chains in primary local routing engines 130 in each of LCCs 128. In this example, state chain 154A includes commit markers 203 and 204 for standby local routing engine 131A and PFE 132A, respectively. State chain 154A also includes commit proposal 214 for PFE 132A. As shown, state chain 154A does not include a commit proposal for standby local routing engine 131A. At other times during state update operation state chain 154A may also include a commit proposal for standby local routing engine 131A. Similar to state chain 150 on primary master routing engine 126, state chain 154A includes a status bit marker on each object to indicate when the object has been acknowledged by standby local routing engine 131A. In addition to objects 250, primary local kernel 142A inserts a ksync object, e.g., ksync object 260A, into state chain 154A upon receipt of an acknowledgement request from primary master routing engine 126. Ksync objects in state chain 154A remind primary local routing engine to respond to the acknowledgement request once all commit markers in state chain 154A have passed the ksync object.

In the example of FIG. 4A, commit marker 202 marks object 250A as holding the last state update acknowledged by primary local routing engine 130A. Commit proposal 212 marks object 250C as holding the most recent acknowledgement request sent to primary local routing engine 130A. Accordingly, primary local kernel 142A has already acknowledged receipt of object 250C, after which primary master kernel 140 moved commit proposal 212 just after object 250C in state chain 150. Primary master kernel 140 forwarded the acknowledgement to standby master routing engine 127, where standby master kernel 141 also moved commit proposal 212 beyond object 250C in state chain 152. The additional commit markers (not shown) for primary local routing engines on each of LCCs 128B-128D are manipulated in the same manner. Commit marker 201 and commit proposal 211 operate in a similar manner with respect to standby master routing engine 127, but only exist on state chain 150.

Again with reference to FIG. 4A, state chain 154A of primary local routing engine 128A includes objects 250A-250G and ksync objects 260A and 260B. Commit marker 203 indicates object 250G as holding the most recent, in temporal relation, state information acknowledged by standby local routing engine 131A. Similarly, commit marker 204 indicates object 250E as holding the most recent state information acknowledged by PFE 132A. Commit proposal 214 indicates object 250G as the most recent object in an acknowledgement request sent to PFE 132A.

Primary local kernel 142A inserted ksync object 260A into state chain 154A after object 250C to mark the receipt of an acknowledgement request for objects up to and including object 250C from primary master routing engine 126. Ksync object 260A functioned to remind primary local routing engine 130A to respond to the acknowledgement request once all consumers on LCC 128A acknowledged receipt of all objects they require up to and including object 250C in the temporally-linked state chain 154A. Primary local kernel 142A inserts a ksync object into state chain 154A every time primary master routing engine 126 sends an acknowledgement request to LCC 128A. Each ksync object corresponds to a new location for commit proposal 212. For example ksync object 260B corresponds to commit proposal 212 as placed following object 250E in state chain 150.

In multi-chassis router 120, before acknowledging a state update from primary master routing engine 126, primary local routing engine 130A forwards the update to standby local routing engine 131A and every consumer on LCC 128A that requires the update. Furthermore, primary local routing engine 130A must wait to receive acknowledgements from standby local routing engine 131A and each shared consumer on LCC 128A before sending the acknowledgement to the master routing engine. For example, in some embodiments, acknowledgements may not be required for non-shared consumers. For example, commit marker 202 in state chains 150 and 152 will remain between objects 250C and 250D until every commit marker in state chain 154A reaches or passes ksync object 260A. In the event of a failover, there may be a significant amount of state update information received, but not acknowledged, by primary local routing engine 130A.

Primary master kernel 140 encodes a random number "N" (not shown), referred to as a sequence number, into commit proposal 212 in state chain 150. For example, N may be a random three-digit number. The acknowledgement request to primary local routing engine corresponding to object 250C also includes the random number N. Primary local kernel 142A encodes the number N into ksync object 260A. Once synchronized, ksync object 160A in state chain 156A of standby local routing engine 131A also includes the sequence number N.

After primary local kernel 142A responds to the acknowledgement request corresponding to ksync object 260A, primary master kernel 140 will later send a new acknowledgement request to corresponding to an object further along state chain 150 and move commit proposal 212 to that object. At this location, primary master kernel 140 encodes a number N+1 into commit proposal 212. In this manner, primary master kernel 140 counts the number of times that an acknowledgement request is sent to LCC 128A. Primary master kernel 140 includes an updated sequence number in every subsequent acknowledgement request.

In the event of a failover, either master or local, upon reconnect with SCC 122, the active local routing engine in LCC 128A sends its most recent sequence number to the active master routing engine in SCC 122. This has the effect of informing the master routing engine that LCC 128A received the state corresponding to that sequence number. Assuming the sequence number sent by LCC 128A matches the sequence number of either the corresponding commit marker or commit proposal in the state chain of the active master kernel, the active master routing engine can resume state updates from that point. If the sequence numbers do not match, then the active master routing engine sends an error signal. In the event of an error, state chain 154 is re-synchronized with the active master routing engine, for example, by way of clearing all state information from LCC 128A and relearning it from SCC 122.

A sequence number mismatch, while rare, may occur, for example, when a standby routing engine, either master or local, assumes the duties of the respective primary routing engine after the primary routing engine produces a new sequence number, but before the primary routing engine was able to update the sequence number encoded in the state chain of the standby routing engine. For example, primary master routing engine 126 updates the sequence number in standby master routing engine 127 after the position of commit marker 212 moves in state chain 150 when it updates the position of the commit marker in state chain 152. Primary local routing engine 130A sends an updated sequence number to standby local routing engine 131A with each new acknowledgement request, which is then included within the corresponding ksync object in state chain 156A. By comparing sequence numbers before resuming state information updates after a failover, multi-chassis router 120 ensures that state chains 154 and 156 in local routing engines 130 and 131 contain the same set of objects 250 as state chains 150 and 152 in master routing engines 126 and 127.

Even if sequence numbers match, the local routing engine may receive objects already available in its state chain. For example, state chain 154A includes two objects after ksync object 260B. In the event of a master routing engine failover, standby master routing engine 127 receives the sequence number N+1 from primary local routing engine 130A. This sequence number corresponds to the sequence number on commit proposal 212 on state chain 152. Therefore, standby master routing engine 127 knows that primary local routing engine 130A received all objects up to and including object 250E. However, standby master routing engine 127 does not know that primary local routing engine 130A has also received objects 250F and 250G. Therefore, standby master routing engine 127 resumes state updates for LCC 128A with object 250F. Primary local kernel 142A simply ignores objects 250F and 250G before adding a new object to state chain 154A, e.g., object 250H. Depending on the circumstances, the first new object to state chain 154A may be either a ksync object 260 or a state update object 250.

During the course of forwarding state updates to standby master routing engine 127 and primary local routing engines 130, primary master kernel 140 also receives new state update objects. State update objects may be created by processes in any chassis of multi-chassis router 120. However, every state update is forwarded to SCC 122 and distributed according to the techniques described prior to being acted upon in any chassis of multi-chassis router 120. For example, a state update produced on LCC 128A is forwarded to SCC 122, where it is inserted in state chain 150 and copied to state chain 152 before being forwarded back to primary local routing engine 130A in LCC 128A. In this manner, primary master routing engine 126 maintains centralized control of multi-chassis router 120.

FIG. 4B illustrates the propagation of state updates from state chain 154A of primary local routing engine 130A to state chain 156A in standby local routing engine 131A, and state information 162A and 164A for PFE 132A and chassisd 135A, respectively. The state information updates shown in FIG. 4B correspond with the state information updates shown in FIG. 4A.

As shown in FIG. 4B, PFE 132A and chassisd 135A may receive objects according to the hierarchical-order of the data structure. Furthermore, PFE 132A and chassisd 135A do not each need to receive every object, but only those updates relevant to their operation. In FIG. 4B, state information 162A and 164A for PFE 132A and chassisd 135A is exemplary of state information updates provided to consumers in any of LCCs 128. For example, LCC 128A includes additional consumers that require state information updates. Updates to other consumers in LCCs 128 and SCC 122 occur in a substantially similar manner to exemplary consumers PFE 132A and chassisd 135A.

State chain 156A is synchronized with state chain 154A. Once synchronized, state chain 156A includes all the objects in state chain 154A. However, because state update information is regularly created in multi-chassis router 120, state chain 156A may often require synchronization with state chain 154A. State chain 156A includes commit marker 204 and commit proposals 214 corresponding to PFE 132A. State chain 156A also includes additional commit markers and commit proposals (not shown) that are part of state chain 150, except for commit marker 203 and commit proposal 213, which correspond to standby local routing engine 131A. In contrast to state chain 154A, objects on state chain 156A do not include a status bit marker to show if a standby local routing engine has received each object. In the event that standby local routing engine 131A becomes the primary local routing engine on LCC 128A and is backed-up by another routing engine serving as a standby local routing engine, status bit markers would then be added to each object in state chain 156A.

State chain 156A includes objects 250A-250G, ksync objects 260A and 260B, commit marker 204 and commit proposal 214. Each of objects 250A-250G are marked as having been acknowledges by standby local routing engine 131A. For example, standby local routing engine 131A acknowledged receipt of ksync object 260A in response to an acknowledgement request. After receiving acknowledgement of ksync object 260A from standby local routing engine 131A, primary local routing engine 130A marked objects 250B, 250C and ksync object 260A as having been acknowledged by standby local routing engine 131A. Primary local routing engine 130A then forwarded objects 250B and 250C, as necessary, to PFE 132A and chassisd 135A. As shown in FIG. 4B, PFE 132A does not require object 250B.

LCC 128A will not respond to the acknowledgment request corresponding to commit proposal 212 on state chain 150 until each of the commit markers on state chain 154A pass or reach ksync object 260A. At that point, primary local routing engine 130A will send an acknowledgment to primary master routing engine 126 and primary master kernel 140 will move commit marker 202 to replace commit proposal 212. Primary master kernel 140 may then reinsert commit proposal 212 at a later position along state chain 150.

The order which consumers receive state information updates may be dependent on the hierarchical-order of the state update data structure. As shown in FIG. 4B, PFE 132A and chassisd 135A received state updates according to the hierarchical-order of the state update data structure. For example, chassisd 135A received state information updates in the following order: object 250A, object 250C, object 250B, object 250F and object 250D. Consumers may require state update objects in a particular order as defined by the hierarchical-order of the state update data structure. For example, a consumer may require state update information regarding PFEs 132 prior to state update information regarding IFCs 134.

The propagation of state updates continues indefinitely in multi-chassis router 120. For example, state chain 154A in primary local routing engine 130A includes object 250G, which has not yet been forwarded to consumers on LCC 128A. Also, primary master routing engine 126 includes object 250H, which has not yet been forwarded to LCC 128A. Primary master routing engine 126 must wait for an acknowledgement from standby master routing engine 127 in order to forward objects 250H to LCC 128A.

As described, processes in every chassis of multi-chassis router 120 may produce state update information, and state update information is produced regularly during operation of multi-chassis router 120. However, in the event of a failure of a consumer, e.g., chassisd 135A in LCC 128A, in order to restart, the consumer may require receiving substantially all state update information required to operate. Chassisd 135A in LCC 128A, for example, may require information on routing engines 130A and 131A, PFE 132A and IFCs 134A. Chassisd 135A requires state information to be resent from primary local kernel 142A. Upon restarting after a failure, chassisd 135A informs primary local kernel 142A that it requires state information updates. Primary local kernel 142A then resends chassisd 135A all the state information it requires that is available in state chain 154A. As before, this state information is sent according to the particular hierarchical data structure necessary for chassisd 134A.

Figure 5:
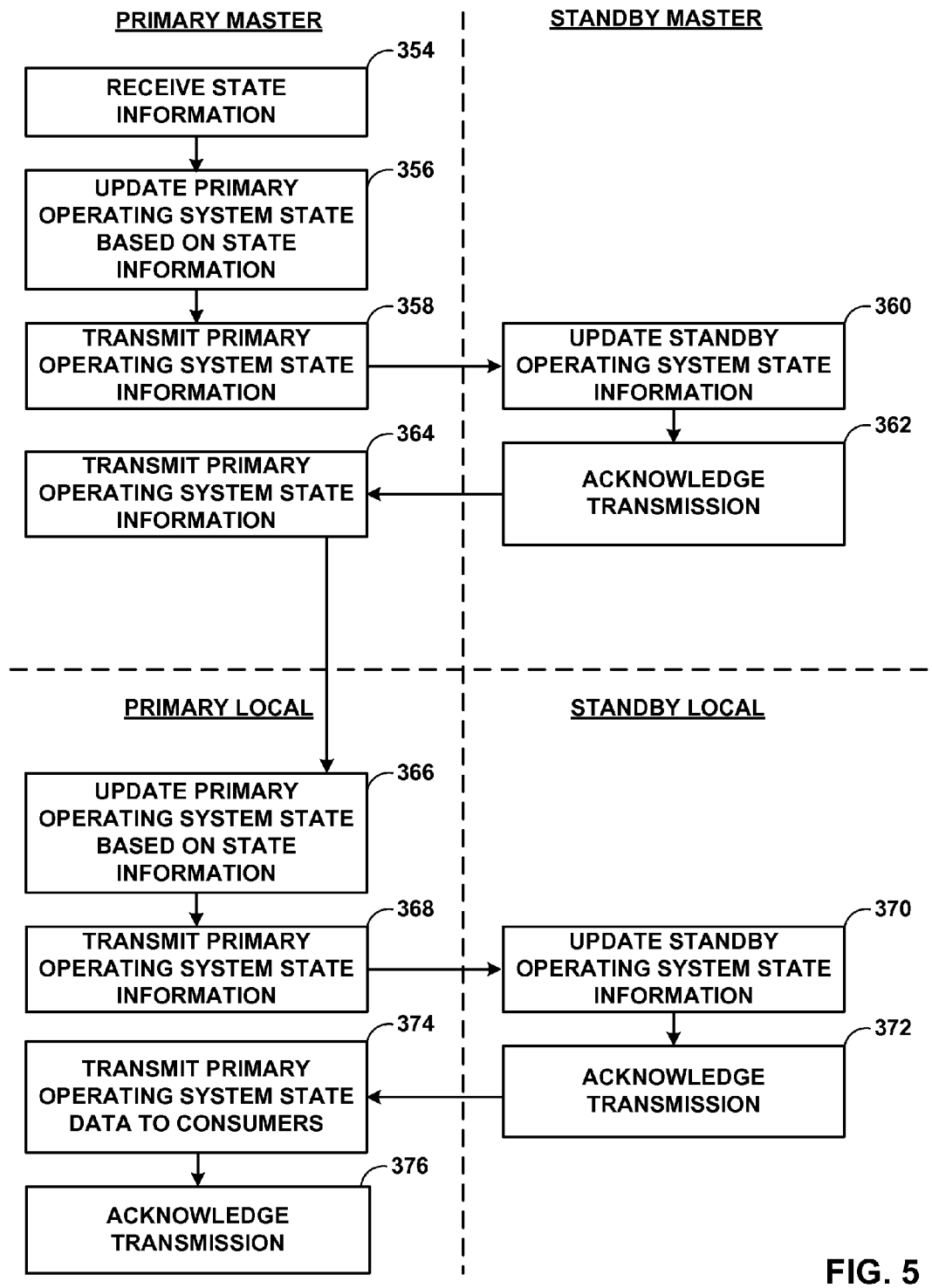
FIG. 5 is a flowchart illustrating an exemplary state update operation in a multi-chassis router consistent with the principles of the invention.

FIG. 5 is a flowchart illustrating exemplary operation of multi-chassis router 120 (FIGS. 2 and 3) when synchronizing and processing state updates in accordance with the principles of the invention. Initially, multi-chassis router 120 and, more particularly, primary master kernel 140 receive information regarding changes to the state of the network or resources with multi-chassis router 120 (354). As one example, primary master kernel 140 receives state information from chassisd 129. In another example, state information may define changes to the network topology, such as the addition of network routes.

In response, primary master kernel 140 updates state chain 150 to reflect the changes in state of multi-chassis router 120 (356). Primary master kernel 140 updates state chain 150 by adding and/or removing objects and adding, deleting or moving commit markers and commit proposals.

Next, primary master kernel 140 synchronizes state chain 152 with state chain 150. In particular, primary master kernel 140 replicates the state information of state chain 150 and transmits the state information to standby master kernel 141 via ksync daemon 144 (358). Upon receiving the updates, standby master kernel 141 processes the state information and executes the necessary changes to synchronize state chain 152 (360). Standby master kernel 141 waits for an acknowledgement request from primary master kernel 140 and then transmits an acknowledgement to primary master kernel 140 via ksync daemon 144 (362).

Once primary master kernel 140 receives the acknowledgement, the primary kernel marks the acknowledged objects with a status bit marker and replicates the state update information to primary local kernels 142 and any local consumers within SCC 122. State update information is replicated via ksync daemons 145 to primary local kernels 142 on and directly to any local consumers within SCC 122 (364). Upon receiving the updates, primary local kernels 142 process the state information and execute the necessary changes to synchronize state chains 154 (366).

State chains 156 are separately synchronized with state chains 154 in each of LCCs 128. Primary local kernels 142 replicate the state information of state chains 154 and transmit the state information to standby kernels 143 via ksync daemons 146 (368). Upon receiving the updates, standby master kernel 141 processes the state information and executes the necessary changes to synchronize state chain 152 (370). Standby kernels 143 then transmit acknowledgements to primary kernels 142 and any local consumers within the LCCs via ksync daemons 146 (372).

Primary local kernels 142 each receive a separate acknowledgment and proceed to transmit the updated state information to consumers, such as PFE 132A (374). In particular, primary local routing engines 130 issue alerts to indicate to the consumers that state updates exist. Upon receiving requests from the consumers, primary kernels 142 transmit the updated state information based upon the locations of the respective commit proposals and commit markers associated with the consumers. The consumers receive the updated state information and make the necessary changes to their respective state information. For example, PFE 132A may receive updated state information from primary local kernel 142A and update state information 162A.

Once a primary local kernel 142 receives acknowledgements from each shared consumer that requires the state update, it sends an acknowledgement to master routing engine 126 (376). Once master routing engine 126 receives an acknowledgement for a state update, it may dequeue the update. For example, in some embodiments, master routing engine 126 may delete the least recent objects in state chain 150 after those objects have been acknowledged by all consumers of primary master routing engine 126, e.g., LCCs 128. The deletions may also be propagated to standby master routing engine 127 and local routing engines LCCs 128. In other embodiments, routing engines may maintain a state information object until it becomes obsolete due to a state update.

As illustrated, multi-chassis router 120 synchronizes and updates state information in accordance with a defined "synchronization gradient," whereby primary master kernel 140 receives state updates, followed by standby master kernel 141, followed by primary local kernels 142A, followed by standby local kernels 143A, followed by consumers in each chassis of multi-chassis router 120. This synchronization gradient may ensure that upon failover, standby routing engines 127 and 131 contain state information that is at least as current as the state information provided to all consumers of state information. Consequently, standby routing engines 127 and 131 are able to readily assume responsibility in the event of a failover, and can continue updating the consumers with the state information as necessary.

Figure 6:
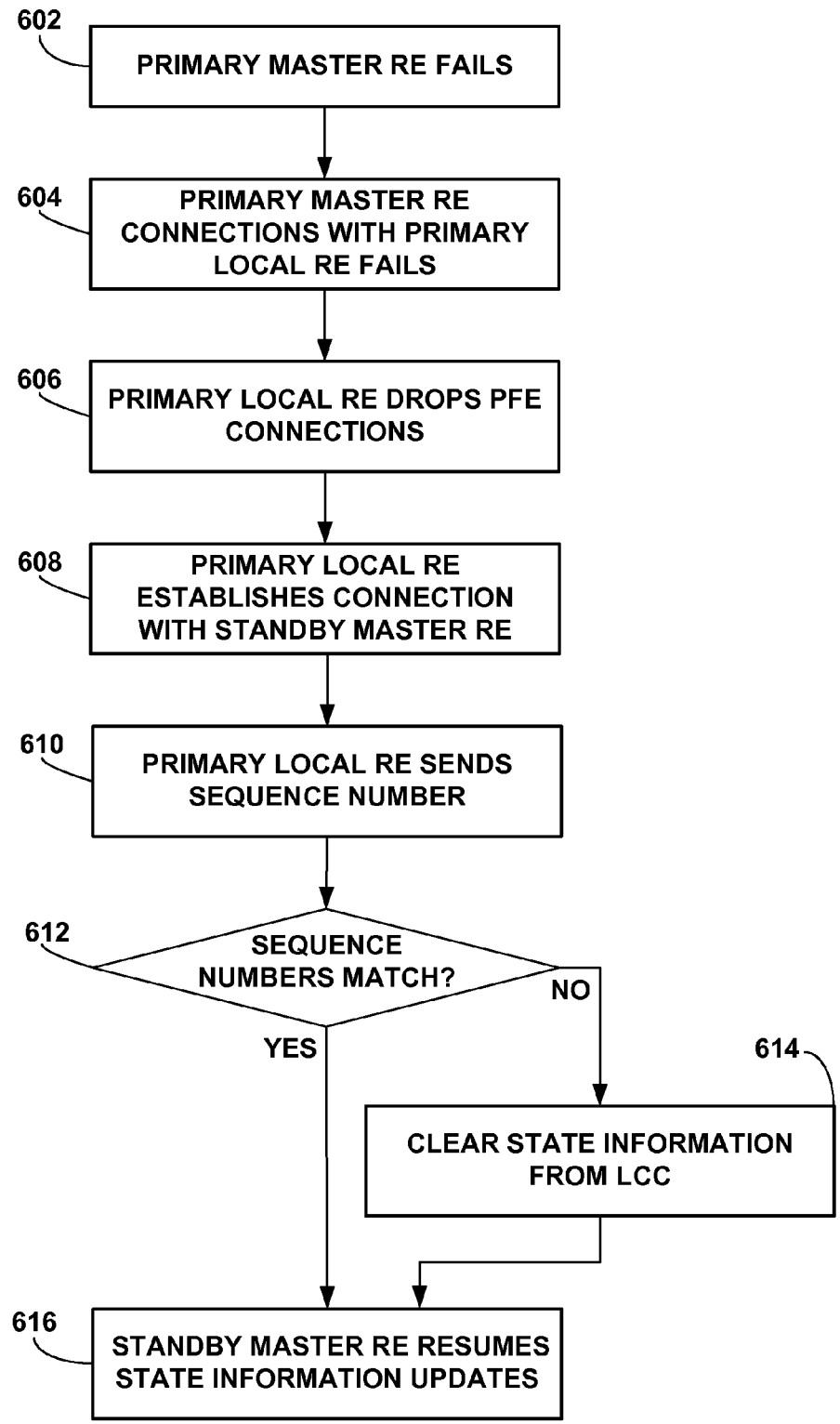
FIG. 6 is a flowchart illustrating failover of a master routing engine consistent with the principles of the invention.

FIG. 6 is a flowchart illustrating exemplary failover of a master routing engine in a multi-chassis router that allows for non-stop forwarding. The failover process is described with reference to multi-chassis router 120 of FIGS. 2 and 3. For exemplary purposes, first assume that primary master routing engine 126 fails (602). For example, failure of primary master routing engine 126 may result from a software failure, hardware failure or an administrator taking primary master routing engine 126 offline. Because of the failure, the connection between primary master routing engine 126 and primary local routing engines 130 also fails (604). Primary local routing engines 130 sever connections with PFEs 132 (606). This prevents primary local routing engines 130 from having to store state updates produced in PFEs 132 until re-connecting with a master routing engine.

Next, primary local routing engines 130 open connections with standby master routing engine 127 (608). Once the connections have been established, primary local routing engines 130 each send their unique sequence number to standby master routing engine 127 (610). Standby master routing engine 127 compares each sequence number received from primary local routing engines 130 with the sequence numbers in commit proposals and commit markers for LCCs 128 in state chain 152 (612). For example, as shown in FIG. 4, commit proposal 212 corresponds to LCC 128A. If the sequence number from one of LCCs 128 matches either the corresponding commit proposal or commit marker each case, standby master kernel 141 begins forwarding state updates to the one of LCCs 128 from that point (616).

In the rare occurrence that sequence numbers do not match, master routing engine 127 sends an error signal to the LCC. In the event of an error, state chain 154 in one or more of LCCs 128 must be re-synchronized with state chain 152, for example, by clearing all state information from the LCC and resending the state information in state chain 152 (614). Clearing all state information from one or more of LCCs 128 may interrupt packet forwarding in multi-chassis router 120. After resetting one or more of LCCs 128 to a known state, master routing engine 127 resumes state updates (616).

In this manner, multi-chassis router 120 maintains packet forwarding during a failover of master routing engine 126. State updates are temporarily interrupted during the failover process while local routing engines 130 establish connections with master routing engine 127, but multi-chassis router 120 continues to send and receive packets during this time according to already known state information. Only in the rare event of a sequence number mismatch might packet forwarding be interrupted in multi-chassis router 120.

While the described failover process describes master routing engine 126 as the primary master routing engine and master routing engine 127 as the standby master routing engine, master routing engines 126 and 127 are substantially similar. That is, both master routing engines 126 and 127 may act as either the primary master routing engine or the standby master routing engine. Therefore, failover may also occur by transferring central control of multi-chassis router 120 from master routing engine 127 to master routing engine 126.

Figure 7:
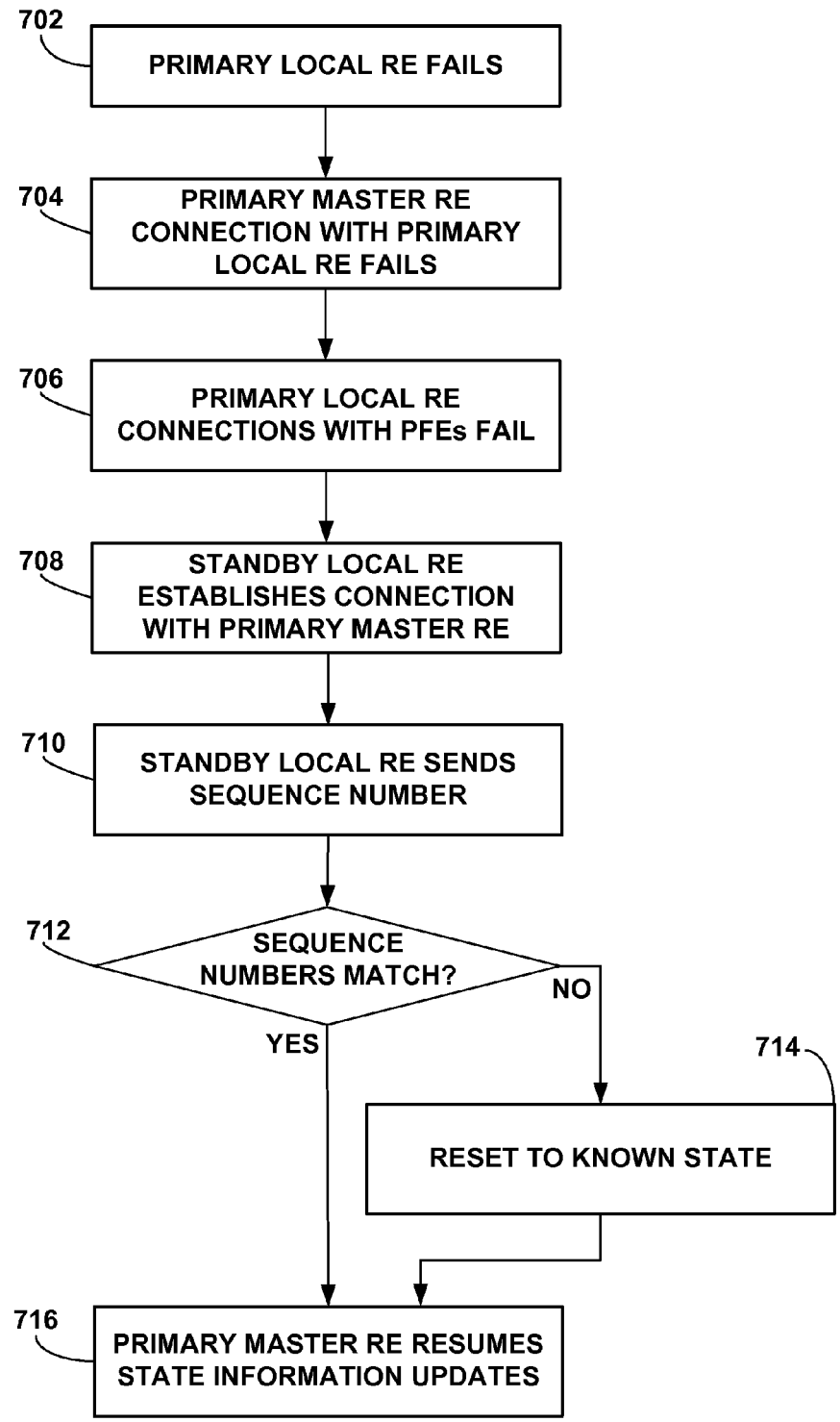
FIG. 7 is a flowchart illustrating failover of a local routing engine consistent with the principles of the invention.

FIG. 7 is a flowchart illustrating exemplary failover of a local routing engine in a multi-chassis router that allows for non-stop forwarding. The failover process is described with reference to multi-chassis router 120 of FIGS. 2 and 3 and, in particular, with reference to LCC 128A. For exemplary purposes, first assume that primary local routing engine 130A fails (702). For example, failure of primary local routing engine 130A may result from a software failure, hardware failure or an administrator taking primary local routing engine 130A offline. Because of the failure, the connection between primary local routing engine 130A and primary master routing engine 126 fails (704). The connection between primary local routing engine 130A and PFEs 132A also fails (706).

Next, standby local routing engine 131A opens a connection with primary master routing engine 126 (708). Once the connection has been established, standby local routing engine 131A sends the sequence number contained in the most recent ksync object in state chain 156A to primary master routing engine 126 (710). Primary master routing engine 126 compares this sequence number with the sequence numbers in commit marker 202 and commit proposal 212. If the sequence number matches either the commit proposal or commit marker, primary master kernel 140 begins forwarding state updates to LCC 128A, beginning with the first object in state chain 150 following the commit proposal or commit marker (716).

In the rare occurrence that sequence numbers do not match, master routing engine 127 sends an error signal to standby local routing engine 131A. In the event of an error, state chain 156A must be re-synchronized with state chain 150, for example, by clearing all state information from LCC 128A (714). Optionally, only LCC 128A may need to be reset to a known state. LCCs 128B-D may continue to receive state updates according to their commit markers and commit proposals in state chain 150. Resetting LCC 128A to a known state may interrupt packet forwarding in multi-chassis router 120. After resetting LCC 128A to a known state, master routing engine 126 resumes state updates (616). This may require requesting state information from processes throughout multi-chassis router 120.

In this manner, multi-chassis router 120 maintains packet forwarding during a failover of local routing engine 130A. State updates for LCC 128A are temporarily interrupted during the failover process while standby local routing engine 130 established a connection with master routing engine 126, but LCC 128A continues to send and receive packets during this time according to already known state information held by consumers of LCC 128A. Only in the rare event of a sequence number mismatch might packet forwarding be interrupted in multi-chassis router 120.

While the described failover process describes local routing engine 130A as the primary local routing engine and local routing engine 131A as the standby local routing engine, local routing engines 130A and 131A are substantially similar. That is, both local routing engines 130A and 131A may act as either the primary local routing engine or the standby local routing engine. Furthermore, the described local routing engine failover techniques are further applicable to primary and standby local routing engines contained within each of LCCs 128.

One or more of the techniques described herein may be partially or wholly executed in software. For example, a computer-readable medium may store or otherwise comprise computer-readable instruction, i.e., program code that can be executed by a processor to carry out one or more of the techniques described above. For example, the computer-readable medium may comprise random access memory (RAM), read-only memory (ROM), non-volatile random access memory (NVRAM), electrically erasable programmable read-only memory (EEPROM), flash memory, magnetic or optical media, or the like.

Various embodiments of the invention have been described. Although described in reference to a multi-chassis router, which each chassis including a plurality of routing engines, the techniques may be applied to any multi-chassis device having a plurality of control nodes in at least one chassis. Examples of other devices include switches, gateways, intelligent hubs, firewalls, workstations, file servers, database servers, and computing devices generally. Furthermore, the described embodiments refer to hierarchically-ordered and temporally-linked data structures, but other embodiments may use different data structures. These and other embodiments are within the scope of the following claims.

The invention claimed is:

1. A multi-chassis network device comprising:
a routing engine for a first chassis configured to manage state information for the multi-chassis network device, wherein the routing engine for the first chassis is further configured to generate a state update indicating a change to the state information and send the state update to a second chassis;
a standby routing engine on the first chassis, wherein the routing engine of the first chassis sends the state update to the standby routing engine of the first chassis before sending the state update to the second chassis;
a routing engine for the second chassis configured to manage local state information for the second chassis, wherein the routing engine of the second chassis operates as an intermediate consumer of the state update from the routing engine of the first chassis; and
a consumer within the second chassis,
wherein the routing engine of the second chassis receives the state update from the routing engine of the first chassis and, in response, updates the local state information in accordance with the state update to synchronize the local state information with the state information of the first chassis and provides the state update to the consumer, and
wherein, in the event of failure of the routing engine of the first chassis, the standby routing engine of the first chassis continues to send state updates to the second chassis on behalf of the failed routing engine of the first chassis.

2. The multi-chassis network device of claim 1, wherein the routing engine of the second chassis receives a first acknowledgement regarding the state update from the consumer, and sends a second acknowledgement regarding the state update to the routing engine of the first chassis only after receiving the first acknowledgement.

3. The multi-chassis network device of claim 1, wherein the routing engine of the second chassis receives an acknowledgement request from the routing engine of the first chassis, and adds a marker within a temporally-linked data structure of state updates in response to the acknowledgement request.

4. The multi-chassis router of claim 3, wherein the marker is a ksync object.

5. The multi-chassis network device of claim 1, further comprising a standby routing engine of the second chassis, wherein the routing engine of the second chassis sends the state update to the standby routing engine of the second chassis.

6. The multi-chassis network device of claim 1, wherein the state update comprises one or more objects in a temporally-linked data structure.

7. The multi-chassis network device of claim 1, wherein the multi-chassis network device is a router.

8. A method for distributing a state update in a multi-chassis network device having a first chassis and a second chassis, the method comprising:
managing state information for the multi-chassis network device with a control unit of the second chassis, wherein the control unit of the second chassis operates as a master control unit for the multi-chassis network device;
generating, with the control unit of the second chassis, a state update that includes a change to the state information with the control unit of the second chassis;
sending the state update from the control unit of the second chassis to a standby control unit of the second chassis;
sending the state update from the control unit of the second chassis to a control unit of a first chassis;
receiving with the control unit of the first chassis the state update from the control unit of the second chassis of the multi-chassis network device;
updating, with the control unit of the first chassis, local state information in accordance with the state update to synchronize the local state information with the state information of the second chassis;
providing, with the control unit of the first chassis, the state update to a consumer within the first chassis; and
upon failure of the control unit of the second chassis, sending subsequent state updates from the standby control unit of the second chassis to the control unit of the first chassis.

9. The method of claim 8, further comprising:
receiving a first acknowledgement regarding the state update from the consumer with the control unit of the first chassis; and
sending a second acknowledgement regarding the state update with the control unit of the first chassis to the control unit of the second chassis only after receiving the first acknowledgement.

10. The method of claim 9, further comprising:
receiving an acknowledgement request from the control unit of the second chassis with the control unit of the first chassis, and
adding a marker within a temporally-linked data structure of state updates in response to the acknowledgement request.

11. The method of claim 10, wherein the marker is a ksync object.

12. The method of claim 8, wherein the control unit of the first chassis is a primary routing engine of the first chassis, the method further comprising:
sending the state update to a standby routing engine of the first chassis before providing the state update to the consumer; and
failing over to the standby routing engine of the first chassis in the event the primary routing engine of the first chassis fails.

13. The method of claim 8, wherein the state update comprises one or more objects in a temporally-linked data structure.

14. The method of claim 8, wherein the multi-chassis network device is a router.

15. A non-transitory computer-readable storage medium containing instructions that cause a programmable processor in a multi-chassis network device to:

manage state information for the multi-chassis network device with a control unit of a second chassis;

generate a state update that includes a change to the state information with the control unit of the second chassis;

send the state update from the control unit of the second chassis to a standby control unit of the second chassis;

send the state update from the control unit of the second chassis to a control unit of a first chassis;

receive with the control unit of the first chassis the state update from the control unit of the second chassis of the multi-chassis network device;

update, with the control unit of the first chassis, local state information in accordance with the state update to synchronize the local state information with the state information of the second chassis;

provide, with the control unit of the first chassis, the state update to a consumer within the first chassis;

receive a first acknowledgement regarding the state update from the consumer with the control unit of the first chassis; and send a second acknowledgement regarding the state update with the control unit of the first chassis to the control unit of the second chassis only after receiving the first acknowledgement.

16. The non-transitory computer-readable medium of claim 15, containing instructions that cause the programmable processor to:

receive an acknowledgement request from the control unit of the second chassis with the control unit of the first chassis, and add a marker within a temporally-linked data structure of state updates in response to the acknowledgement request.

17. The non-transitory computer-readable medium of claim 16, wherein the marker is a ksync object.

* * * * *